United States Patent [19]

Fukushima et al.

[11] Patent Number: 5,070,488
[45] Date of Patent: Dec. 3, 1991

[54] OPTICAL INTEGRATED CIRCUIT AND OPTICAL APPARATUS

[76] Inventors: Atsuko Fukushima, 1545, Yoshidacho, Totsuka-ku, Yokohama; Yasuo Hira, 1534-36, Sugetacho, Kanagawa-ku, Yokohama; Hidemi Sato, 3404-35, Nakatacho, Izumi-ku, Yokohama; Kazumi Kawamoto, 92-6, Torigaoka, Totsuka-ku, Yokohama; Kenchi Ito, 850, Maiokacho, Totsuka-ku, Yokohama; Masataka Shiba, 2-1-5-602, Royokuen-4-chome, Izumi-ku, Yokohama; Akira Arimoto, 14-4, Nakajimacho, Kodaira-shi, all of Japan

[21] Appl. No.: 372,639

[22] Filed: Jun. 28, 1989

[30] Foreign Application Priority Data

Jun. 29, 1988 [JP] Japan .................. 63-159105
Jun. 5, 1989 [JP] Japan .................. 1-141015

[51] Int. Cl.$^5$ .......................... G11B 7/00; G11B 21/00
[52] U.S. Cl. .................................. 360/44.12; 369/103; 369/109; 369/110; 385/14; 385/37; 359/571
[58] Field of Search ............... 369/44.12, 44.37, 44.38, 369/44.11, 103, 109, 110; 350/96.11–96.15, 162.22, 162.17, 162.2, 162.24, 162.16; 372/102

[56] References Cited

U.S. PATENT DOCUMENTS

| | | | |
|---|---|---|---|
| 4,435,041 | 3/1984 | Torok et al. | 350/162.24 X |
| 4,718,052 | 1/1988 | Kondo et al. | 369/44.12 X |
| 4,737,946 | 4/1988 | Yamashita et al. | 350/96.11 X |
| 4,779,259 | 10/1988 | Kono et al. | 369/44.12 X |
| 4,797,867 | 1/1989 | Sunagawa et al. | 369/44.12 X |
| 4,842,969 | 6/1989 | Kawatsuki | 350/162.22 X |

FOREIGN PATENT DOCUMENTS

| | | | |
|---|---|---|---|
| 0259832 | 3/1988 | European Pat. Off. | 369/44.12 |
| 61-85641 | 1/1986 | Japan . | |
| 61-29650 | 12/1986 | Japan . | |

OTHER PUBLICATIONS

J. H. Harris et al. "Theory & Design of Couplers" Applied Optics 11/10/72 pp. 2234–2240.
T. Tamir & S. T. Peng, "Analysis & Design of Grating Couplers" Appl. Physics 14/77, pp. 235–254.
G. Hatakoshi et al. "Waveguide Grating Lenses for Optical Couplers" Applied Physics, 1984 vol. 23, No. 11, pp. 1749–1753.
M. L. Dakss "Grating Coupler for Efficient Excitation of Optical Guided Waves in Thin Films" in Applied Physics Letters 1970, vol. 16, No. 12.

*Primary Examiner*—Roy N. Envall, Jr.
*Assistant Examiner*—Hung H. Bui
*Attorney, Agent, or Firm*—Antonelli, Terry, Stout & Kraus

[57] ABSTRACT

An optical integrated circuit and an optical apparatus used in optical communication or an opto-electronics apparatus such as an optical disk recording apparatus, in which various kinds of aberration caused by wavelength variation of a light source when a semiconductor laser is used as the light source. An aberration correcting grating having such grating pitches as to nearly satisfy the Bragg condition preferably with respect to a certain wavelength of the semiconductor laser beam is used. As a result, lowering of incidence (entrance) and radiation (exit) coupling efficiencies of the grating coupler and aberration such as chromatic aberration can be prevented. Even if a multi-mode semiconductor laser is used as a light source, the characteristics of the optical integrated circuit and optical apparatus do not vary largely.

24 Claims, 11 Drawing Sheets

OPTICAL INTEGRATED CIRCUIT AND OPTICAL APPARATUS

BACKGROUND OF THE INVENTION

The present invention relates to an optical integrated circuit and an optical apparatus used in an optoelectronics device such as an optical communication apparatus or an optical disk recording apparatus, and in particular to an optical integrated circuit and an optical apparatus in which various aberrations caused by variation in wavelength of a light source when a semiconductor laser is used as the light source are corrected.

Conventional optical components used in fields such as an optical communication system and optical information processing comprise bulk components such as lenses, prisms and gratings mechanically assembled. Since the above described optical components have large outer dimensions, therefore, they cannot meet a demand for size reduction. Further, they are expensive. Further, because of assembly using mechanical coupling, the above described optical components lack safety for long time use and are inferior in reliability. Because of these various problems, the concept of an optical integrated circuit (optical IC) comprising a plurality of devices integrated on a single substrate has been introduced in recent years to study significant reduction in size and cost of optical components. That is to say, an optical IC comprises optical components obtained by integrating a photodetector device, a light emitting device, a lens of waveguide type (thin film type) and a grating on a single substrate.

One component of the optical IC is a grating coupler, which is a waveguide diffraction grating formed in an optical waveguide. The grating coupler functions to make an optical beam incident on the optical waveguide and make the optical beam radiate from the optical waveguide. The grating coupler is thus one of key components of the optical IC.

Concrete design methods of the above described grating coupler are discussed in J. H. Harris, et al. "Theory and Design of Periodic Couplers", Appl. Opt., 11, 10 (1972), and T. Tamir and S. T. Peng, "Analysis and Design of Grating Couplers", Appl. Phys., 14, (1977), for example. As for optical components formed into an optical IC by using a grating coupler, examples of their application to an optical head for optical disk apparatus are described in JP-A-61-85641 and JP-A-61-296540.

When a semiconductor laser is used as the light source, the above described prior art has the following problems. That is to say, the wavelength of light emitted by a semiconductor laser typically changes because of nonuniformity in operation temperature and manufacturing process for fabricating the semiconductor laser. A first problem will now be described. In case the emitted wavelength is not single, the incidence angle whereat the beam can enter the optical waveguide is changed by the grating coupler, resulting in a problem of lowering in incidence coupling efficiency. Further, there is also a problem that the radiation angle changes in the same way as the foregoing description when a grating coupler is used at the exit side.

A second problem will now be described. When a grating coupler having nonequal pitches and taking a curvilinear shape is employed as a focusing grating coupler used as an objective lens of an optical head, the spot size of a beam at a focal point must be reduced up to nearly the diffration limit in order to read out high-density information recorded on an optical disk medium. Therefore, the numerical aperture (NA) of a lens, which is defined as the diameter of lens/focal length, must be not less than 0.45. In case of the above described conventional focusing grating coupler, however, the wavelength deviation $\Delta\lambda$ of the laser light must satisfy a strict value represented as $|\Delta\lambda| = 9.8 \times 10^{-4} \mu m$ when NA is 0.45. Further, deviation $\delta$ of the laser light from the optical axis and deviation $\Delta N$ of the effective refractive index of the guided optical beam must respectively satisfy the following values.

$$|\delta| = 6.9 \times 10^{-4} \text{ deg}$$

$$|\Delta N| = 9.8 \times 10^{-4}$$

These values are extremely strict and are not at a practical level. Especially, since $\delta$ is small, the above described conventional focusing grating coupler cannot be applied to an integrated optical pickup in which high-speed access is implemented by propagating surface acoustic waves at right angles to the guided optical beam and deflecting the beam to the left and right with respect to the optical axis by using the acoustic waves, resulting in a drawback.

A third problem will now be described. In the above described conventional optical head fabricated as an optical IC, a beam splitter for detecting a signal supplied from the optical disk is constituted as a so-called coplanar optical device. Therefore, the reception angle (i.e., magnitude of deviation of an incidence angle of light with respect to a device which does not cause significant deterioration in device characteristics and hence is permitted) is small, and the detection range of a focal point error signal is narrow. The range in which focusing servo functions is limited to a narrow range, and characteristics deterioration caused by a change in wavelength of laser light is significant, i.e., so-called chromatic aberration is significant, resulting in a subject to be solved.

A fourth problem will now be described. When the optical disk is not in parallel to the above described conventional optical head, the optical axis obtained when the light reflected by a surface of the optical disk is introduced to the optical waveguide path again is deviated from the center axis of the beam splitter. Therefore, an offset is caused in a tracking error detection signal, resulting in a subject.

SUMMARY OF THE INVENTION

A first object of the present invention is to provide an optical integrated circuit in which the circuit characteristics do not largely charge and the beam utilization efficiency is high even when a multi-mode semiconductor laser light is used.

A second object of the present invention is to provide an optical pickup, i.e., an optical information readout apparatus allowing deflection of a guided optical beam from the optical axis to the left and right at high speed by using surface acoustic waves and allowing high-speed access.

A third object of the present invention is to provide an improved optical head which effectively functions even when the wavelength of laser light changes and in which focusing servo effectively functions over a wide area.

A fourth object of the present invention is to provide an optical head capable of reducing an offset of the tracking error detection signal, which poses a problem when an optical disk is so tilted as not to be in parallel to the optical head.

The above described first object is achieved by diffracting laser light by using a grating separately provided for the purpose of aberration correction. In accordance with a feature of the present invention, the grating period of the above described grating for aberration correction is preferably so set as to meet nearly the Bragg condition with respect to a certain wavelength of semiconductor laser light.

The above described object is achieved by integrating, in a hybrid form, a grating having linear uniform shapes, which radiates a guided optical beam from an optical waveguide to the inside of a substrate, and a focusing device functioning to converge the radiated light to one point. Electrodes for exciting surface acoustic waves can be disposed on the above described substrate, and especially on the optical waveguide. Thereby, the direction of radiation of the guided optical beam can be changed, and an optical integrated circuit can be used as a high-speed light deflection apparatus.

The above described third and fourth objects are achieved by an optical head comprising a beam splitter so formed on an optical waveguide between a laser beam incidence (entrace) grating coupler and a laser beam radiation (exit) grating coupler as to detect a signal fed from an optical disk, quarter a reflected beam fed from the optical disk, and radiate the quartered beams into the substrate at predetermined radiation angles with respect to the optical waveguide plane, and two pairs of gratings respectively having nonequal pitches and taking curvilinear shapes, so disposed on the left and right of the nearly central axis of luminous flux of the above described reflected beam as to focus the reflected beam on a photodetecting face of a photodetector disposed on the outside of the end face of the substrate.

Owing to characteristic configuration according to the present invention, the following operation effects are achieved. That is to say, in case the wavelength $\lambda$ of the semiconductor laser beam changes from $\lambda(0)$ to $\lambda(1)$ (where $\lambda(0) > \lambda(1)$), strong coupling of light to the optical waveguide is caused only when the incidence angle $\alpha$ to the grating coupler is $\alpha(0)$ and $\alpha(1)$ respectively corresponding to $\lambda(0)$ and $\lambda(1)$. In the absence of an aberration correcting grating, the incidence coupling efficiency lowers because the angle of incidence onto the grating coupler does not change even if the wavelength changes. Therefore, a grating for correcting aberration is installed to make grating period D and inclination angle $\delta$ proper. For beams respectively having wavelengths $\lambda(0)$ and $\lambda(1)$, therefore, diffraction angles from the aberration correcting grating can be set at certain specific angles $\delta(0)$ and $\delta(1)$, respectively. Angles $\delta(0)$ and $\delta(1)$ refracts at the interface with respect to the substrate, resulting in angles $\alpha(0)$ and $\alpha(1)$ of incidence to the grating coupler, respectively. Even if the wavelength of semiconductor laser light changes, therefore, angles of incidence to the grating coupler can be made $\alpha(0)$ and $\alpha(1)$ respectively corresponding to $\lambda(0)$ and $\lambda(1)$, and lowering of the incidence coupling efficiency caused by variation of wavelength of the laser beam can be prevented. Further, aberration such as chromatic aberration can also be prevented. For obtaining light having high strength, it is important to define D so that the aberration correcting grating may satisfy the Bragg condition with respect to at least one wavelength among beams of $\lambda(0)$ to $\lambda(1)$ or diffraction may be caused in the vicinity of the Bragg condition.

BRIEF DESCRIPTION OF THE DRAWINGS

FIG. 6 is an oblique view of an optical integrated circuit with focusing devices integrated in a hybrid form. FIG. 8 is an oblique view showing a light deflection effect implemented by an optical deflector.

FIG. 9a is a sectional view of the third embodiment. FIG. 9b is a top view of the third embodiment.

FIG. 10 is a top view of its optical integrated circuit. FIG. 11 is a side view of its optical integrated circuit.

FIG. 12 is a top view showing the case where the optical disk is located at the focal point. FIG. 13 is a top view showing the case where the optical disk is located in front of the focal point. FIG. 14 is a top view showing the case where the optical disk is located behind the focal point.

FIG. 15 is a sectional view of a grating coupler for incidence (i.e., an entrance grating coupler) having a rectangular grating shape. FIG. 16 is a sectional view of an incidence grating coupler having a blazed grating shape. FIG. 17 is a sectional view of a grating coupler for radiation (i.e., an exit grating coupler) having a rectangular grating shape. FIG. 18 is a sectional view of an exit grating coupler having a blazed grating shape.

FIG. 19a is its side view. FIG. 19b is its top view.

FIG. 20a is its side view. FIG. 20b is its top view.

FIG. 21 shows a ninth embodiment of the present invention, which is an optical system of an optical head in which the reflected light is returned from an optical disk to an optical integrated circuit again.

DESCRIPTION OF THE PREFERRED EMBODIMENTS

Preferred embodiments of the present invention will now be described more concretely by referring to drawings.

Figure 1:
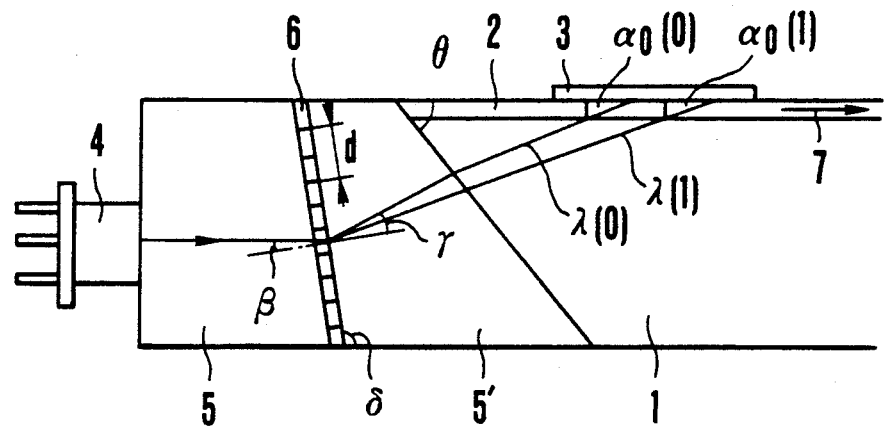
FIG. 1 is a configuration diagram showing an embodiment of an optical integrated circuit according to the present invention.

In FIG. 1, LiNbO$_3$ crystals are used as a substrate 1. In the vicinity of a surface of the substrate, an optical waveguide 2 and a grating coupler 3 having a refractive index somewhat higher than that of the substrate are formed. Subsequently, glass blocks 5 and 5' for making a beam emitted from a semiconductor laser 4 incident onto the substrate 1 in parallel are formed. A grating 6 for correcting aberration is put between the glass blocks 5 and 5'.

The operation of the optical integrated circuit according to the present invention shown in FIG. 1 will now be described. In FIG. 1, the grating coupler 3 is a diffraction grating having linear uniform shapes. An incidence angle $\alpha$ of a laser beam onto the grating coupler 3 is related to grating pitch $\Lambda$ of the grating, effective refractive index N of the optical waveguide 2, refractive index $n_s$ of the substrate 1, and wavelength $\lambda$ of the semiconductor laser 4 as $$\cos\alpha = \frac{N - \lambda/\Lambda}{n_s} \tag{1}$$

From this relation, the incidence angle $\alpha$ is uniquely defined with respect to the wavelength $\lambda$. In accordance with the present invention, therefore, the aberration correcting grating 6 is provided in order to prevent lowering of the incidence coupling efficiency even if the wavelength of the semiconductor laser 4 changes. That is to say, the grating period d and the inclination angle $\delta$ of the aberration correcting grating 6 are made proper when the wavelength of the semiconductor laser 4 has changed from $\lambda(0)$ to $\lambda(1)$ (where $\lambda(0) > \lambda(1)$). As a result, the diffraction angles from the aberration correcting grating 6 with respect to beams respectively having wavelengths $\lambda(0)$ and $\lambda(1)$ can be set at certain specific angles $\gamma(0)$ and $\gamma(1)$, respectively. Even if the wavelength of the semiconductor laser 4 changes, therefore, the incidence angles to the grating coupler can be made equal to $\alpha(0)$ and $\alpha(1)$ respectively corresponding to $\lambda(0)$ and $\lambda(1)$. It is thus possible to prevent lowering of the incidence coupling efficinecy and aberration such as chromatic aberration caused by variation of wavelength of laser light. Concrete examples of the grating period d and inclination angle $\delta$ of the aberration correcting grating 6 will now be described.

First of all, d is conditioned to satisfy equations (2) and (3) so that light having the wavelength $\lambda(0)$ may be diffracted by the aberration correcting grating 6 under the Bragg condition or in the vicinity of the Bragg condition.

$$\sin\beta(0) \simeq \frac{\lambda(0)}{2n_p d} \tag{2}$$

$$\beta(0) \simeq \delta(0) \tag{3}$$

where $\beta(0)$ = incidence (entrance) angle with respect to the diffraction grating at the wavelength $\lambda(0)$ $\gamma(0)$ = radiation (exit) angle with respect to the diffraction grating at the wavelength $\lambda(0)$ In addition, d is conditioned to satisfy equation (4) so that light having the wavelength $\lambda(1)$ may be diffracted in the vicinity of the Bragg condition.

$$\sin\gamma(1) - \sin\beta(1) = \frac{\lambda(1)}{n_p d} m \tag{4}$$

where $\beta(1)$ = incidence angle with respect to the diffraction grating at the wavelength $\lambda(1)$ ($\beta(0) = \beta(1)$)

$\gamma(1)$ = radiation angle with respect to the diffraction grating at the wavelength $\lambda(1)$ Further, d, $\delta$ and $\theta$ are so defined that equations (5) to (12) below may be satisfied.

$$\cos\alpha_0(0) = \frac{N - \lambda(0)/\Lambda}{n_s} \tag{5}$$

$$\cos\alpha_0(1) = \frac{N - \lambda(1)/\Lambda}{n_s} \tag{6}$$

$$\alpha_1(0) = \alpha_0(0) + \theta - \frac{\pi}{2} \tag{7}$$

$$\alpha_1(1) = \alpha_0(1) + \theta - \frac{\pi}{2} \tag{8}$$

$$\alpha_2(0) = \sin + \left[ \frac{n_s}{n_p} \sin\alpha_1(0) \right] \tag{9}$$

$$\alpha_2(1) = \sin + \left[ \frac{n_s}{n_p} \sin\alpha_1(1) \right] \tag{10}$$

$$\gamma(0) = \alpha_2(0) - \theta - \delta + \pi \tag{11}$$

$$\gamma(1) = \alpha_2(1) - \theta - \delta + \pi \tag{12}$$

where $\alpha_0(0)$ = angle of incidence to the grating coupler at $\lambda(0)$ $\alpha_0(1)$ = angle of incidence to the grating coupler at $\lambda(1)$ $\alpha_1(0)$ = angle of refraction from the glass block to the substrate at $\lambda(0)$ $\alpha_1(1)$ = angle of refraction from the glass block to the substrate at $\lambda(1)$ $\alpha_2(0)$ = angle of incidence to the substrate at $\lambda(0)$ $\alpha_2(1)$ = angle of incidence to the substrate at $\lambda(1)$ $\Lambda$ = grating period of the grating coupler d = grating period of the aberration correcting grating $\theta$ = cutoff angle of end face of the substrate $\delta$ = inclination of the aberration correcting grating 6 m = order of diffraction by the aberration correcting grating, which is set at $-1$ N = effective refractive index of the optical waveguide 2

$n_s$ = refractive index of the substrate 1

$n_p$ = refractive index of the glass block

Figure 2:
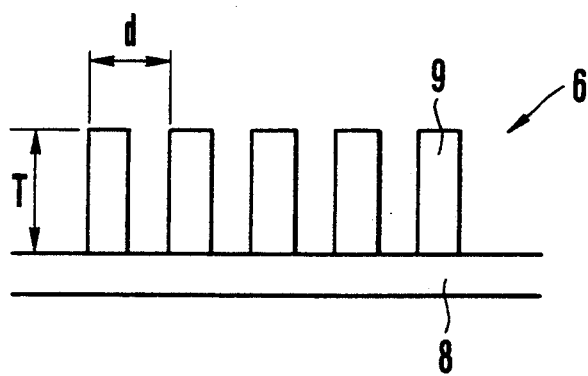
FIG. 2 is a sectional view of an aberration correcting grating used in an optical integrated circuit of the present invention.

FIG. 2 shows a preferred sectional shape of the aberration correcting grating 6 according to the present invention. For obtaining diffracted light having high strength, it is desirable to use a diffraction grating having a shape which satisfies the Bragg condition already described.

A concrete example of a diffraction grating satisfying the condition heretofore described will now be described. A semiconductor laser with λ(0) equivalent to 0.78 μm and λ(1) equivalent to 0.776 μm is used. On a Ti-diffusion optical waveguide comprising LiNbO₃ crystals with $n_s=2.2$ and $N=2.209$, a grating coupler with $\Lambda=4$ μm is formed. A glass block made of BK-7 with $n_p=1.45$ is stuck to an end face whereon a basic laser beam is incident In this case, θ, δ and d become approximately 56°, approximately 100° and approximately 1.6 μm, respectivley. Although in this case incidence angles of beams respectively having λ(0) and λ(1) are equivalent each other with respect to the diffraction grating, the difference in radiation (exit), angle becomes approximately 0.1°. In this case, the efficiency of the diffracted beam (i.e., radiated beam of the aberration correcting grating 6) becomes 90% or more when T is approximately 11 μm.

An example of the above described aberration correcting grating 6 will now be described. As a substrate, BK-7 glass 8 is used. On the glass, SiO₂ 9 is so formed as to have a thickness of approximately 11 μm by using a film forming method such as the CVD method. The SiO₂ layer is finely processed so as to have a predetermined shape by using photolithography. The glass blocks 5 and 5═ made of BK-7 and the above described diffraction grating 6 are then stuck together with a binding agent having a refractive index nearly equivalent to that of BK-7. A periodic structure is formed by the above described SiO₂ 9 and the binding agent, and the periodic structure functions as the aberration correcting grating 6.

Figure 3:
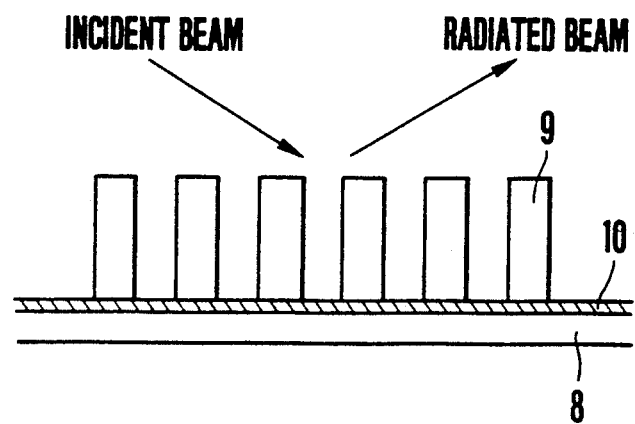
FIG. 3 is a sectional view of another aberration correcting grating used in an optical integrated circuit of the present invention.

As for the form of the diffraction grating used in the present invention, a diffraction grating of reflection type comprising a reflection film 10 as shown in FIG. 3 may be used instead of the diffraction grating of transmission type as shown in FIGS. 1 and 2.

Figure 4:
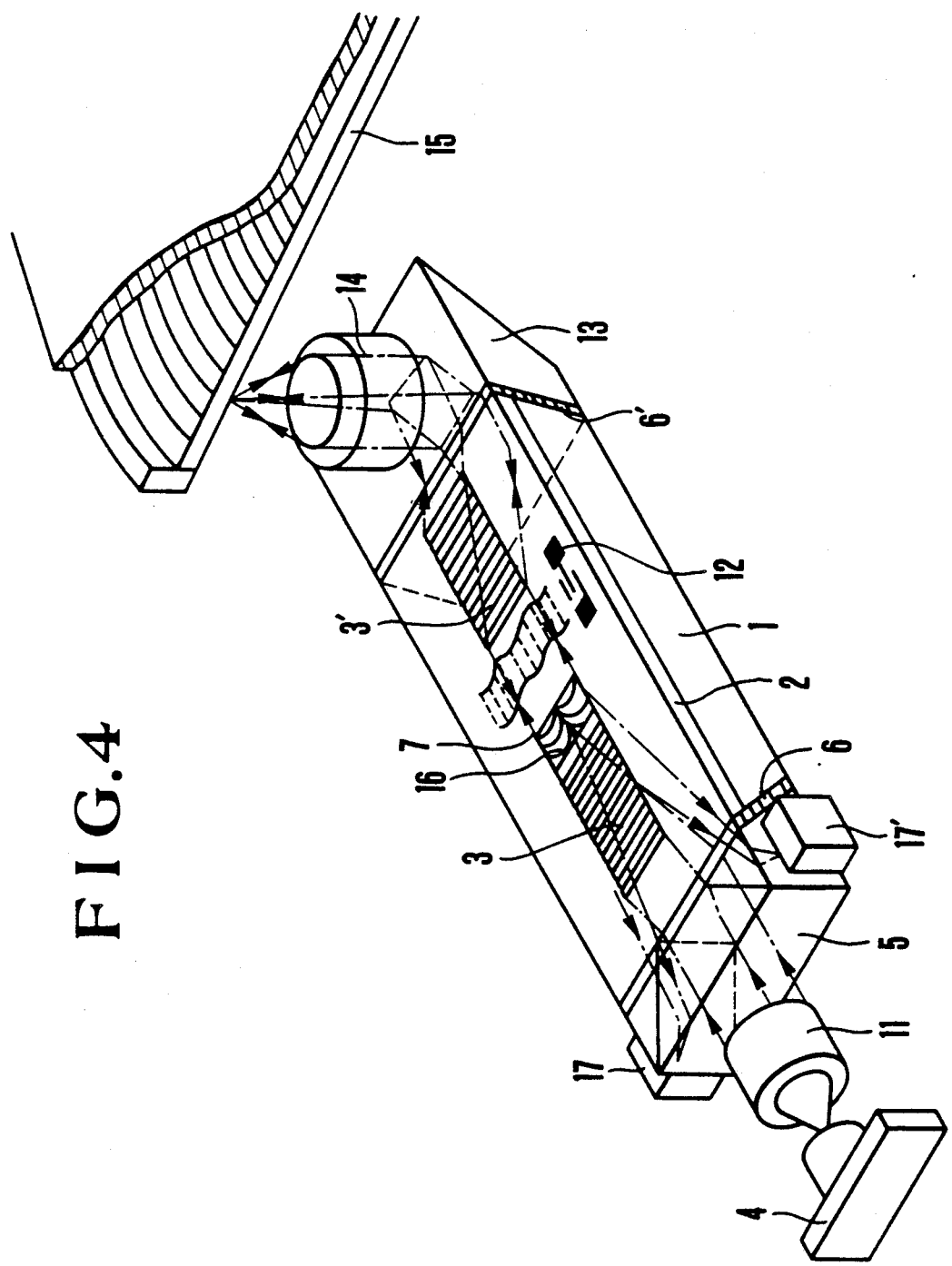
FIG. 4 is an oblique view showing an optical head for optical disk apparatus according to the present invention.

FIG. 4 shows an embodiment of the present invention, which is an optical integrated circuit effective as an optical head used in an optical disk apparatus. In FIG. 4, a beam radiated from the semiconductor laser 4 is incident on the grating coupler 3 from the substrate 1 via a collimator lens 11, the glass block 5 and the aberration correcting grating 6, and is guided to the optical waveguide 2. A guided beam 7 is deflected in an optical deflector 12 so formed on the optical waveguide 2 as to use surface acoustic waves (SAW), and is radiated again into the substrate at a grating coupler 3' of radiation side. The beam thus radiated is diffracted by an aberration correcting grating 6'. After the optical path is so changed as to be vertical by a glass block 13, the beam is focused to one point on an optical disk 15 by an objective lens 14. The beam reflected by the optical disk 15 traces the identical path and is guided into the optical waveguide 2 by a grating coupler 3' located at the radiation side. The beam is then passed through the optical deflector 12, bisected by a focusing beam splitter 16 formed on the optical waveguide 2, and radiated into the substrate. Each of the beams thus bisected and radiated is focused onto one point on the photodetecting face of one of photodiodes 17 and 17' respectively disposed on end faces of the glass block 5. The signal fed from the optical disk 15 is detected.

Figure 5:
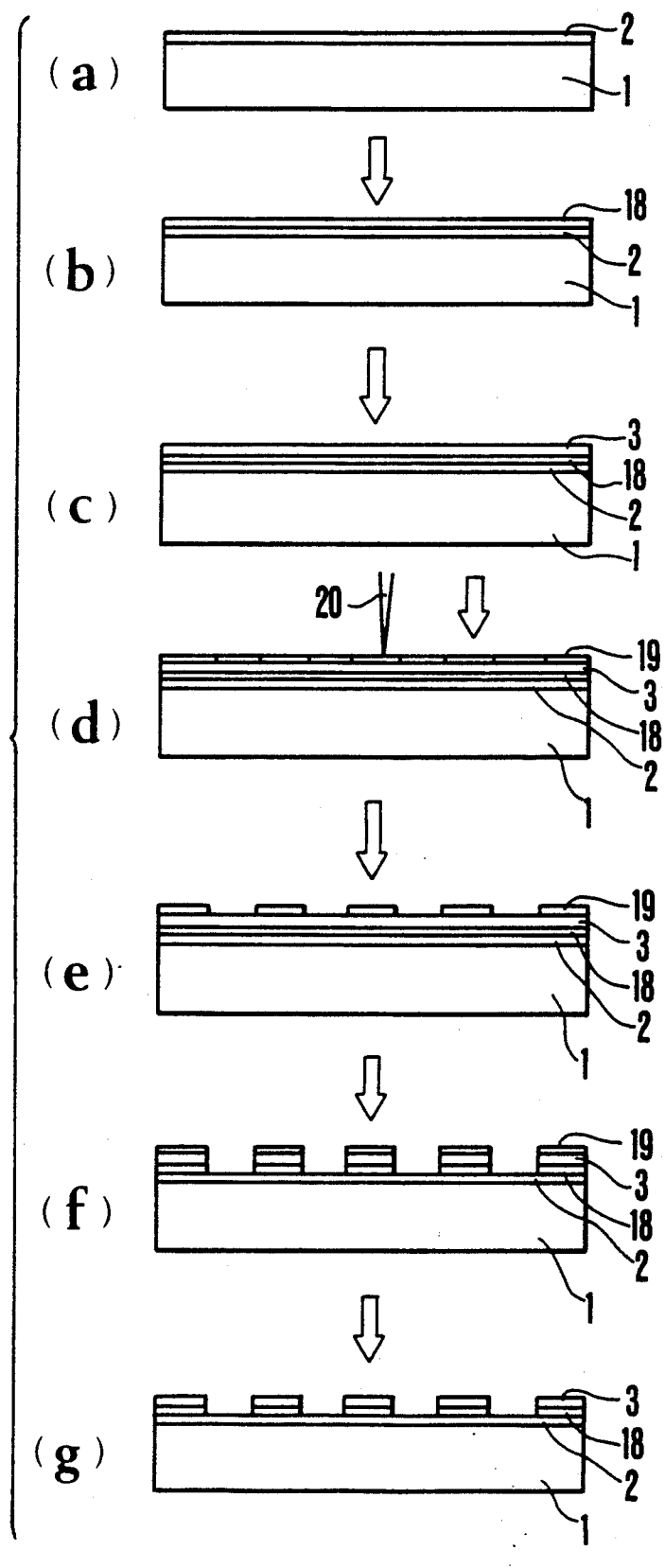
FIGS. 5(a) to 5(g) schematically show fabrication process steps of an optical integrated circuit according to the present invention.

A method for manufacturing the optical integrated circuit shown in FIG. 4 and its operation will now be described in detail. With regard to various optical devices of waveguide type such as the grating couplers 3 and 3' and the focusing beam splitter 16, the method for manufacturing the optical integrated circuit as shown in FIG. 4 will now be described by referring to FIGS. 5(a) to 5(i g). In FIG. 5(a), LiNbO₃ crystals optically polished is used as the substrate 1, and Ti is so deposited as to have a thickness of 24 nm by sputtering. The optical waveguide 2 is then formed by thermal diffusion. The above descirbed sputtering is performed under the condition that the high frequency power is 300 W, argon gas pressure 0.5 Pa, and sputtering speed 4 nm/sec. Thermal diffusion was performed by using an electric furnace under the temperature of 1,000° C. in an atmosphere of argon gas for 2 hours and then in flow of oxygen gas for 0.5 hour. The optical waveguide had a surface refractive index $n_f=2.22$ and was an optical waveguide of single TE mode having an equivalent refractive index $N=2.209$. The optical waveguide 2 may be fabricated by using the proton exchange technique. In FIG. 5(b), a buffer layer 18 formed on the optical waveguide 2 functions to prevent occurrence of peeling-off or cracking of a grating layer subsequently formed. As the buffer layer 18, glass 7059 produced by Corning corporation was so formed as to have a thickness of 10 nm. Sputtering is performed under the condition that the radio frequency power is 100 W, argon gas pressure 0.35 Pa and sputtering speed 0.2 nm/sec. In FIG. 5(c), as a grating layer 3, TiO₂ was so formed on the buffer layer by reactive sputtering as to have a thickness of 100 nm. The sputtering condition is as follows. A TiO₂ target is used, and argon and oxygen are used as sputtering gas. Flow rate ratio between O₂ and Ar is 0.7, sputtering gas pressure 0.42 Pa, radio frequency power 500 W, and sputtering speed 0.1 nm/sec. In order to process finely the grating layer 3 and the buffer layer 18 to provide them with shapes of optical devices of waveguide type. In FIG. 5(d), a resist 19 was formed on the grating layer 3 by using the rotating application technique. Here, methyl chloride polystyrene (CMS-EXR produced by Toyo Soda) which is an electron beam resist was used as the resist 19 and provided with a thickness of 0.5 μm. After the above described resist was prebaked at 130° C. for 20 minutes, an electron beam 20 was applied to the resist in accordance with a predetermined grating shape. As for the radiation condition, the electron beam diameter and the amount of radiation were defined to be 0.1 μm and 16 μc/cm², respectively. In FIG. 5(e), after exposure with an electron beam, development was performed to form a mask made of resists. In FIG. 5(f), the grating layer 3 and the buffer layer 18 were processed finely by ion etching. As for the condition of ion etching, CF₄ was used as etching gas and pressure of 3.8 Pa, radio frequency power of 200 W and etching time of 15 min. were used. In FIG. 5(g), after the etching, the mask made of the resist was removed. Various optical devices of waveguide type such as grating couplers 3 and 3' and the focusing beam splitter 16 could be thus formed. As for the SAW optical deflector 12, an Al film having a thickness of 100 nm was vapor-deposited and processed finely to form a predetermined comb electrode. The lift-off technique was used for the above described processing. As for specifications of the electrode, the center wavelength is 14 μm, the center frequency 250 MHz, and the number of pairs 8. With regard to the aberration correcting 6, BK-7 glass was used as the substrate 8. On the BK-7 glass, $SiO_2$ 9 was so formed as to have a thickness of approximately 11 μm by the CVD technique using $SiCl_4$ and $O_2$ as raw materials, the vapor deposition technique or sputtering. In order to process the $SiO_2$ 9 to attain a predetermined grating shape by using photolithography, photoresist (OFPR800) was so formed by the rotating application technique as to have a thickness of 1 μm in the same way as the above described various optical devices of waveguide type. After the above described resist was prebaked at 85° C. for 30 minutes, contact exposure was performed by using a photomask depicting a predetermined grating shape and a UV exposure apparatus. After exposure, immersion processing in benzene chloride was performed at 40° C. for 5 minutes, and then development was performed. On the grating pattern made of the resist, Cr was vapor-deposited Ultrasonic cleaning in acetone was then performed to remove the resist and form a mask made of Cr. Thereafter, $SiO_2$ was finely processed by ion etching using $CF_4$ gas, and Cr was removed. As a result, the grating pattern could be formed. This photolithography technique can be applied to fine processing of the above described grating layer and buffer layer as well. End faces of the substrate 1 having the above described devices formed thereon, the aberration correcting grating 6 and 6', and the glass blocks 5 and 5' made of BK-7 were cut at predetermined angles and polished. They were stuck together with a binding agent having a refractive index nearly equivalent to that of BK-7. The semiconductor laser 4 and the photodiodes 17 and 17' were coupled to the block stuck together at their end faces to form the optical integrated circuit as shown in FIG. 4. Operation of the optical integrated circuit shown in FIG. 4 will now be described. The beam (having wavelength of 0.776 to 0.78 μm) radiated from the semiconductor laser 4 is collimated by the collimator lens 11 and diffracted by the aberration correcting grating 6. The beam thus diffracted is refracted at the interface of substrate 1, and guided to the optical waveguide 2 in accordance with the equations (5) and (6) according to the wavelength and the periodicity length of the grating coupler. The guided beam 7 is deflected by the SAW optical deflector 12 and incident on the grating coupler 3'. Depending upon the wavelength and the grating period of the grating coupler, the incidence beam is radiated into the substrate in accordance with the equations (5) and (6). The beam thus radiated into the substrate is diffracted by the aberration correcting grating 6' and reflected at an end face of the glass block 13. The beam thus radiated upward is focused by a lens 14 having mechanism moved perpendicular to the optical disk 15 and focused onto a pit (information) of the optical disk 15. The beam reflected by the optical disk 15 is passed through the lens 14, the glass block 13 and the aberration correcting grating 6' and is incident on the optical waveguide 2 again by the grating coupler 3'. The beam is then incident on the focusing beam splitter 16 and bisected. The beams thus bisected are focused on the bisected photodiodes 17 and 17'. The information of the pit is thus read out.

When the wavelength of the semiconductor laser changes in the range of 0.776 to 0.78 μm under the condition that the aberration correcting grating 6 is absent, the angle causing coupling to the optical waveguide 2 changes by approximately 0.1°. Since the angle to the grating coupler 3 is always constant, however, the incidence coupling efficiency lowers. By using the aberration correcting grating 6 having grating period d equivalent to approximately 1.6 μm and thickness of grating T equivalent to approximately 11 μm in accordance with the present invention, however, the beam is diffracted at a different angle depending upon the wavelength, and incident on the grating coupler 3 at an optimum angle, resulting in a high incidence coupling efficiency.

Further, when the wavelength of the semiconductor laser changes in the range of 0.776 to 0.78 μm under the condition that the aberration correcting grating 6' is not present, the incidence angle with respect to the lens 14 changes by approximately 0.1°, and the spot position is displaced in the direction of jitter by approximately 8 μm. By using the aberration correcting grating 6' having grating period d equivalent to approximately 2.5 μm and thickness of grating T equivalent to approximately 11 μm in accordance with the present invention, however, the difference in incidence angle becomes not larger than 0.01°, and variation of spot position in the jitter direction becomes not larger than 0.01 μm. Owing to the aberration correcting grating 6' of the present invention, dependence of variation of spot position on the optical disk upon the wavelength is largely reduced, and an optical head wherefrom more accurate information can be read is obtained.

Constituent materials of the above described optical integrated circuit include quartz, an $SiO_2$ glass substrate, a dielectric crystal substrate, an $SiO_2$ glass optical waveguide and a metal diffusion optical waveguide. Constituent materials of devices 3 and 3' include chalcogenide glass, $TiO_2$, ZnO and ZnS. Constituent materials of the aberration correcting grating 6 include $SiO_2$ glass and a polymer compound. The constituent material of the glass block 10 includes $SiO_2$ glass. In general, general materials used to form optical devices, optical waveguides and thin film optical devices can be used. The devices can be formed by these materials as well as the lithography technique and vacuum technique used in fabricating semiconductors. Further, the above described optical head implemented as an optical integrated circuit can be applied to an optical head for laser beam printer, as well.

Figure 6:
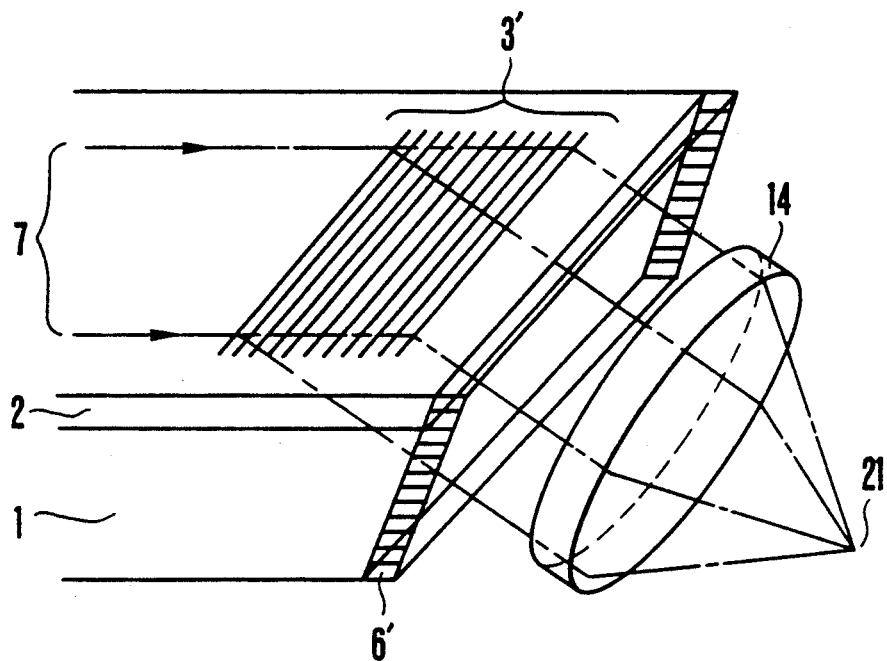
FIGS. 6 and 8 show a second embodiment of the present invention.

FIG. 6 shows a second embodiment of the present invention.

In FIG. 6, numeral 1 denotes a substrate made of a dielectric or glass, 2 an optical waveguide so formed on a first principal plane of the substrate 1 as to have a refractive index higher than that of the substrate 1, 3' a grating coupler so formed on the optical waveguide 2 as to have linear uniform shapes, 7 a guided beam propagated within the optical waveguide 2, 14 a lens for focusing the beam radiated from the substrate, and 21 a focusing point (hereafter referred to as focal point, for convenience) of the radiated beam caused by the lens. The guided beam 7 must comprise collimated parallel beams.

It is now assumed that the wavelength of the laser beam emitted from the light source is λ, the effective refractive index of the optical waveguide 2 with respect to the guided beam 7 N, the refractive index of the substrate 1 $n_s$, and the period of linear uniform grating coupler 3'λ. In order to radiate an mth beam toward the substrate in a direction forming an angle θ with respect to a substrate surface by using the grating coupler 3', the condition $$\frac{2\pi}{\lambda} n_s \cos\theta = \frac{2\pi}{\lambda} N + \frac{2\pi}{\Lambda} m \quad (m: \text{integer}) \qquad (13)$$

must be satisfied. As the diffracted beam, a $(-1)$-th beam is generally used.

$$\frac{2\pi}{\lambda} < \frac{2\pi}{\lambda} N + \frac{2\pi}{\Lambda} m \qquad (14)$$

is satisfied in addition to the condition expression (13), the guided beam is radiated only in the substrate direction and it is not radiated into the air, resulting in a high efficiency.

Assuming now that $m = -1$ and $\theta = 30°$, the grating period $\Lambda$ is given by $$\Lambda = \frac{\lambda}{N - \frac{\sqrt{3}}{2} n_s} \qquad (15)$$

As an example, it is now assumed that LiNbO$_3$ with $n_s = 2.177$ is used as the substrate 1 and the optical waveguide 2 is so fabricated by thermal diffusion of Ti as to satisfy the relation $N = 2.187$. Further assuming that a semiconductor laser with $\lambda = 0.78$ μm is used as the light source, it follows that $\Lambda = 2.59$ μm and hence the optical integrated circuit can be satisfactorily fabricated by using the photolithography technique. Further, since the condition (14) is also satisfied at this time, the guided beam can be radiated efficiently only in the substrate direction.

As another example, it is now assumed that Pyrex glass with $n_s = 1.472$ is used as the substrate 1 and Corning 7059 glass having a refractive index of 1.544 so formed into a film by sputtering as to satisfy the relation $N = 1.520$ is used as the optical waveguide 2. Further assuming that a semiconductor laser with $\lambda = 0.78$ μm is used as the light source in this as well, it follows that $\Lambda = 3.18$ μm and hence the optical integrate circuit can be satisfactorily fabricated by using the photolithography technique in this case as well. Further, since the condition (14) is also satisfied at this time, the guided beam can be radiated efficiently only in the substrate direction.

As heretofore described, a large effect can be obtained in optical integrated circuits of the present invention as compared with those of the prior art.

Aberration incurred when the above described wavelength deviation $\Delta\lambda$ of laser beam, deviation $\Delta N$ of the effective refractive index and deviation $\delta$ of the laser beam from the optical axis will now be described.

Figure 7:
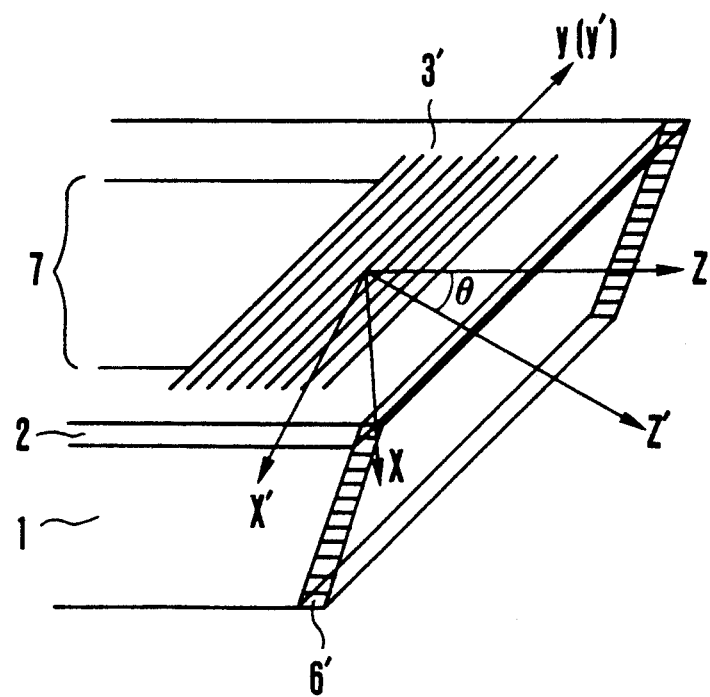
FIG. 7 is an oblique view showing a linear orthogonal coordinate system used in explanation of embodiment.

It is now assumed that a linear orthogonal coordinate system of left hand system has its Z axis in the propagation direction of the beam obtained when $\delta = 0$ as shown in FIG. 7. Further, it is assumed that another linear orthogonal coordinate system of left hand system has the radiation (exit) point of the beam as its origin and has its Z' axis in the direction wherein the beam is radiated when $\delta = 0$. Origins of these two coordinate systems are made coincident each other. Further, the Z axis and Z' axis form an angle $\theta$.

First of all, when parallel incident beams are incident in a direction deviated from the Z axis by $\delta$, the phase matching condition in the xyz system is represented as $$K_o N \cos\delta - 2\pi/\Lambda = Pz \qquad (16)$$

$$K_o N \sin\delta = Py$$

$$Px = +\sqrt{(k_o n_s)^2 - Py^2 - Pz^2}$$

where $k_o = 2\pi/80$, and Px, Py and Pz are components of the radiated vector in the, xyz system. Since vectors of the xyz system and x'y'z system are coupled each other by the transformation $$\begin{bmatrix} Px' \\ Py' \\ Pz' \end{bmatrix} = \begin{bmatrix} \cos\theta & 0 & -\sin\theta \\ 0 & 1 & 0 \\ \sin\theta & 0 & \cos\theta \end{bmatrix} \begin{bmatrix} Px \\ Py \\ Pz \end{bmatrix}. \qquad (17)$$

the radiated vector is represented in the x'y'z' system as $$\begin{cases} Px' = k_o n_s \cos\theta \sqrt{1 - \left[\frac{N}{n_s} \sin\delta\right]^2 - \left[\frac{N\cos\delta - \lambda/\Lambda}{n_s}\right]^2} - k_o n_s \cos\theta \left[\frac{N\cos\delta - \lambda/\Lambda}{n_s}\right] \\ Py' = k_o n_s \left[\frac{N}{n_s}\right] \sin\delta \\ Pz' = k_o n_s \sin\theta \sqrt{1 - \left[\frac{N}{n_s} \sin\delta\right]^2 - \left[\frac{N\cos\delta - \lambda/\Lambda}{n_s}\right]^2} + k_o n_s \cos\theta \left[\frac{N\cos\delta - \lambda/\Lambda}{n_s}\right] \end{cases} \qquad (18)$$

Assuming now that the direction of the radiated beam and the Z' axis form an angle $\Phi$ in case where the above described LiNbO$_3$ is used as the substrate, the approximate relation $|\delta| \approx \Phi$ holds true in the range $|\delta| \leq 0.01$ rad. Further, as a result of refraction at a boundary face between the substrate and the air, the relation $\Phi \approx 2|\delta|$ holds true in the air. That is to say, the guided beam is radiated in a direction inclined from the Z' axis nearly by $2\delta$ as parallel beams.

If a conventional objective lens for optical pickup is used as the focusing lens 14, the radiated beam comprises parallel beams. If $\delta$ is sufficiently small as described above, therefore, aberration is so small that any problem may be hardly caused.

Figure 8:
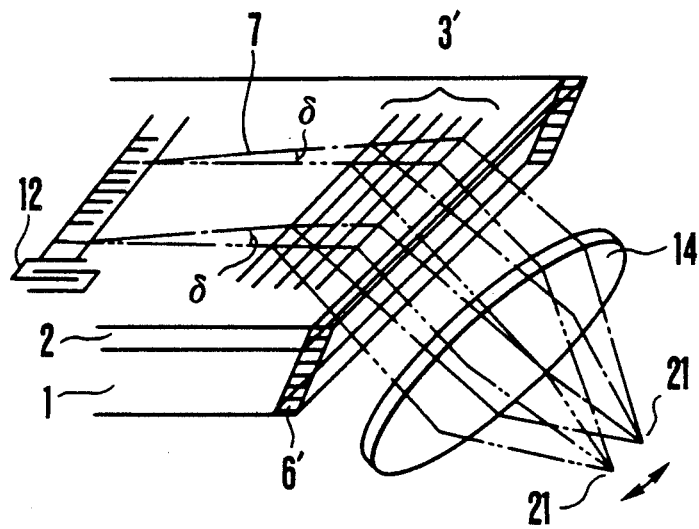

Assuming that the focal length of a lens is 3 mm, for example, the focal point 21 moves by approximately 30 μm when $\delta \approx 0.01$. By positively deflecting the guided beam 7 by means of SAW (surface acoustic waves) excited in the SAW optical deflector 12, therefore, access and tracking correction of several tracks can be performed as shown in FIG. 8.

By making the shape of the grating coupler linear as heretofore described, it is possible to constitute a pickup objective lens system which is not significantly affected by deflection from the optical axis Z of the guided beam 7.

On the other hand, when deviation ΔN of the effective refractive index and wavelength deviation of the laser light source are caused, the direction of the radiated beam is deviated in the xz (x'z') plane by an angle Δθ. However, the radiated beam comprises parallel beams. Its magnitude is represented approximately as $$\Delta\theta \simeq \frac{-\Delta N}{n_s \sin\theta} + \frac{\Delta\lambda}{\Lambda n_s \sin\theta} \text{ rad} \quad (19)$$

When ΔN or Δλ appears singly in the above described case where LiNbO$_3$ is used as the substrate, it follows that $$\Delta\theta \sim -0.92 \ \Delta N \text{ rad}$$

$$\Delta\theta \sim 0.35 \ \Delta\lambda \text{ rad} \quad (20)$$

With due regard to the effect of refraction, the relation |Δθ| < 0.01 rad is satisfied in the range represented as $$|\Delta N| \leq 5.0 \times 10^{-3}$$

$$|\Delta\lambda| \leq 1.3 \times 10^{-2} \ \mu m \quad (21)$$

These values are sufficiently large as compared with those of the prior art.

In the optical integrated circuit of the present invention heretofore described, a diffraction grating taking a rectilinear shape is used in the grating coupler. Even if Δλ, ΔN, ΔN and δ have relatively large values, therefore, the radiated beam comprises parallel beams. If a high performance objective lens for pickup is used, therefore, caused aberration can be reduced.

Figure 9A:
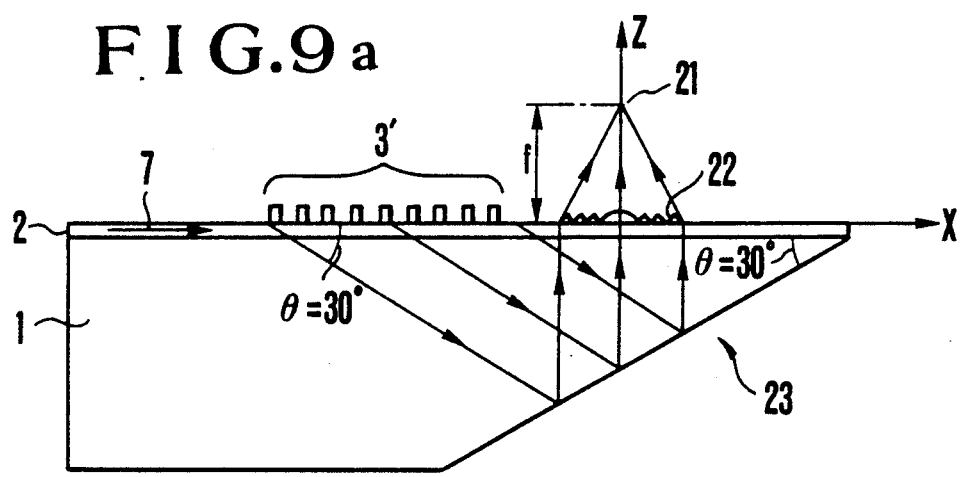
FIGS. 9a and 9b show a third embodiment of the present invention, which is an optical integrated circuit comprising a combination of a grating coupler and a Fresnel lens.
Figure 9B:
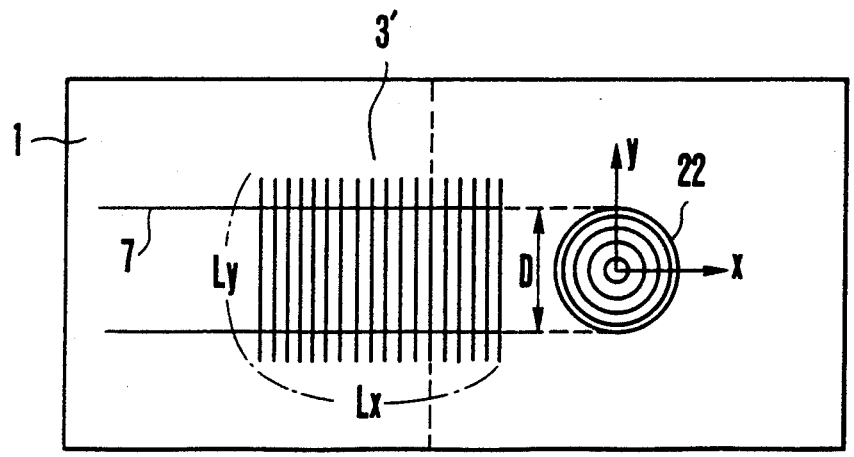

FIG. 9 shows an optical integrated circuit which is a third embodiment of the present invention. FIG. 9a is its sectional view, and FIG. 9b is its top view.

In FIGS. 9a and 9b, numeral 1 denotes a substrate comprising an optical material such as niobic acid lithium (LiNbO$_3$) having a refractive index 2.177, for example. Numeral 2 denotes an optical waveguide having a refractive index higher than that of the substrate. In this example, titanium was vapor-deposited on the LiNbO$_3$ substrate and diffused by heat to form an optical waveguide having a thickness of approximately 1.5 μm. Numeral 3' denotes a grating coupler so formed on the optical waveguide as to have linear uniform shapes. The grating coupler 3' is formed by an optical material having a refractive index larger than that of the optical waveguide. In this example, a titanium oxide (TiO$_2$) layer having a refractive index of 2.4 was formed on the optical waveguide. A rectilinear grating couples having a period of 2.59 μm was formed over a length of 4 mm in the direction of light advance by a pattern forming technique using lithography. Numeral 22 denotes lens means disposed on the optical waveguide 3 in front of the diffraction grating 3'. In this example, a Fresnel lens of transmission type having an aperture of approximately 2 mm was formed on the optical waveguide 2 by using the well-known technique. The aperture of the lens is made equal to or larger than the width of the guided beam. Although a bulk lens may be used as the lens, the Fresnel lens is preferred for the sake of integrating the lens on the substrate and achieving compact configuration. Numeral 23 denotes a substrate end face comprising a reflecting face cut and polished at an angle of 30° with respect to the substrate surface. This inclination angle is made equal Numeral 21 denotes a focal point f of the light. The guided beam 7 shown in FIG. 9b comprises collimated parallel beams.

The thickness of titanium oxide (TiO$_2$) constituting the diffraction grating as well as the focal length f and the aperture D of the Fresnel lens will now be described in more detail. When a Fresnel lens is used as the objective lens of the optical pickup head, the numerical aperture NA must be made nearly equal to 0.5. The substantial numeral aperture of this lens depends on the numeral aperture of the diffraction grating. It is now assumed that the aperture length of the diffraction grating in the x direction is Lx and the aperture length of the diffraction grating in the y direction is Ly as shown in FIG. 9b. When the beam radiated by the diffraction grating is radiated in a direction forming an angle θ with respect to the surface of the substrate 1, the area of bundle of rays incident on the Fresnel lens 22 is Lxcosθ-×Ly. Assuming that θ = 30° and f = 2 mm as in the present embodiment, for example, relations Lx = 2.30 mm, Ly = 1.15 mm must be satisfied. In order to cover all bundle of rays at this time, the aperture D of the Fresnel lens must satisfy the relation $$D \geq 2 \times \sqrt{\left(\frac{1.15}{2}\right)^2 + \left(\frac{1.15}{2}\right)^2} = 1.63 \text{ mm}.$$

The beam is radiated from the grating coupler 3' with an amplitude in the x axis direction depending upon exp(−αx), where α is referred to as radiation loss coefficient. In order to assure the numerical aperture, the condition αLx ≤ 1 must be satisfied. In case of the above described example, it follows that $$\alpha \leq \frac{1}{Lx} = 0.435 \text{ mm}^{-1}.$$

The value of α depends upon the refractive index and thickness of the substrate 1, the optical waveguide 2 and the grating couple 3'. When LiNbO$_3$ having a refractive index $n_s = 2.177$ and the optical waveguide 2 having a refractive index N = 2.187 are used and TiO$_2$ having a refractive index $n_s = 2.4$ is used as the loading layer material of the grating coupler, the relation α ≈ 0.4 is satisfied by making the thickness of TiO$_2$ equivalent to approximately 30 nm.

Returning to the description of the optical integrated circuit having configuration shown in FIGS. 9a and 9b, parameters of respective optical systems will now be described.

It is now assumed that the wavelength of the laser beam of the light source (not illustrated in FIGS. 9a and 9b) is λ, the effective refractive index of the optical waveguide 2 N, the refractive index of the substrate 1 ns, and the period of the linear uniform grating coupler 3'Λ.

Assuming that the incidence direction of the beam radiated by the grating coupler 3' and the direction of the normal line of the polished face 23 of the substrate end face form an angle Φ, total reflection occurs when $$n_s \sin\Phi > 1 \quad (22)$$

The present embodiment is included in the total reflection range represented by the expression (22), because $n_s = 2.177$ and Φ = 30°.

It is now assumed that the focal distance of the Fresnel lens 22 is f and a coordinate system has the center of the Fresnel lens as its origin as shown in FIG. 9b. The shape expression of the Fresnel lens is given by $$\Psi(x,y) = \frac{2\pi}{\lambda} \sqrt{x^2 + y^2 + f^2} = 2m'\pi \quad (23)$$

(where m' is an integer) Since this Fresnel lens is axissymmetrical with respect to the optical axis, the lowest degree of aberration is 3. As described in Meier, J. Opt. Sco. Amer., Vol. 55, No. 8 (1965), pp. 987 to 992, the third wave front aberration function is represented as $$\Phi A^3(r,\theta) = \frac{2\pi}{\lambda'} \left[ -\frac{1}{8} Sr^4 + \frac{1}{2} r^3(\cos\theta Cx + \sin\theta Cy) - \frac{1}{2} r^2(\cos^2\theta Ax + \sin^2\theta Ay + 2\cos\theta\sin\theta Axy) - \frac{1}{4} r^2 F + \frac{1}{2} r(\cos\theta Dx + \sin\theta Dy) \right]. \quad (24)$$

Using relations $x = r\cos\theta$, $y = r\sin\theta$, the function has been represented by means of polar coordinates. Further, $\lambda'$ is the wavelength of the actual light source.

Regarding aberration of the fifth or higher order as sufficiently small and neglecting it in the present embodiment, allowable upper limits of $\Delta n$, $\Delta\lambda$ and $\delta$ satisfying the Marechal condition are derived. That is to say, upper limit values of $|\Delta n|$, $|\lambda|$ and $|\delta|$ are represented as $$\left.\begin{array}{l} |\Delta n| \leq 1.6 \times 10^{-1} \\ |\Delta\lambda| \leq 5.2 \times 10^{-3} \,\mu m \\ |\delta| \leq 2.0 \times 10^{-3} \,\text{rad} \end{array}\right\} \quad (25)$$

Comparing the above described values of the prior art with the expression (25), it is found that the upper limits of the present embodiment represented by the expression (25) are significantly relaxed as compared with the grating coupler of the prior art having the focusing function. As compared with the focusing grating coupler of hybrid type using the conventional focusing bulk lens, the expression (25) is somewhat inferior in $|\Delta n|$, but is improved in $|\delta|$ and $|\Delta\lambda|$. If $|\Delta\lambda|$ in the expression (25) is allowed, the actual wavelength variation up to $\pm 4$ nm is allowed when a semiconductor laser having a wavelength $\lambda = 0.78 \,\mu m$ is used, resulting in a practicable level. With regard to $|\Delta n|$ as well, the actual variation of effective refractive index is 0.0035 when $LiNbO_3$ with refractive index $n_s = 2.177$ is used as the substrate and the wave 7 with effective refractive index $N = 2.187$ is used. Since the variation value can be sufficiently controlled in usual process such as thermal diffusion and film forming, no problem is posed.

Figure 10:
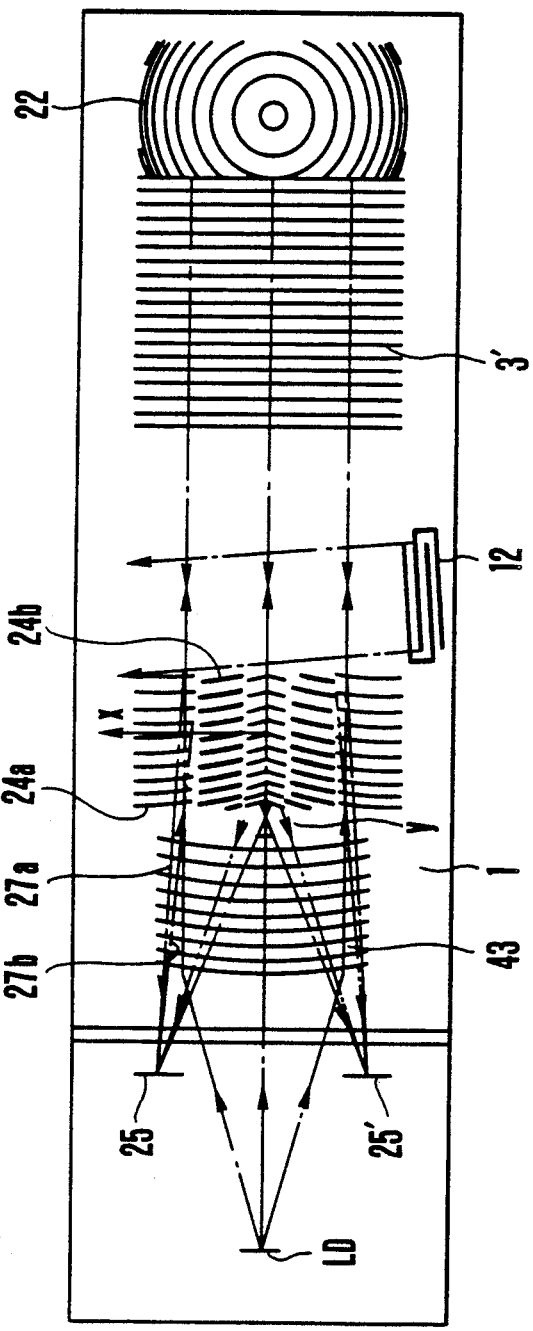
FIGS. 10 to 11 show an optical head for optical disk apparatus, which is a fourth embodiment of the present invention.
Figure 11:
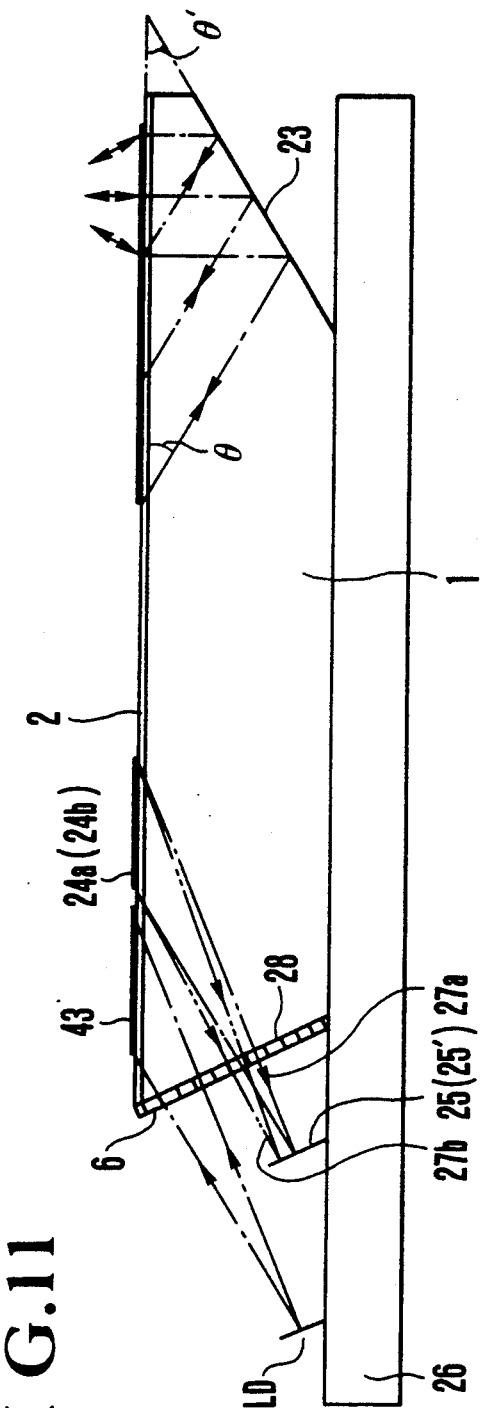

FIG. 10 shows in a top view a fourth embodiment of the present invention. FIG. 11 is its side view. In FIGS. 10 and 11, an optical head according to the present invention comprises an optical waveguide 2 formed on the surface of an optical substrate 1 such as a dielectric or glass, the optical waveguide 2 having a refractive index larger than that of the substrate 1, a semiconductor laser LD for injecting a laser beam into the optical waveguide 2, an incidence grating coupler 43 so formed on the optical waveguide 2 by a diffraction grating having nonequal pitches and taking curvilinear shapes as to introduce the radiated beam of the semiconductor laser into the optical waveguide 2, a diffraction grating 6 for correcting aberration, the diffraction grating 6 constituting collimater means in conjunction with the incidence grating coupler 43, a grating coupler 3' so formed on the optical waveguide 2 as to have equal pitches and take rectilinear shapes, a Fresnel lens 22 comprising a diffraction grating formed as concentric circles, the Fresnel lens 22 cooperating with the grating coupler 3' to radiate the laser beam propagated in the optical waveguide 2 (in accordance with the advance direction represented by arrows) into the substrate located outside the optical waveguide 2 at a radiation angle $\theta$ and focus beams totally reflected by the end face 23 of the substrate onto one point located on a disk functioning as an information recording face (not illustrated here but represented as 15 in FIG. 4), beam splitters 24a and 24b for quartering the beam reflected by the disk and led into the optical waveguide 2 by the Fresnel lens 22 so as to generate two pairs of, i.e., four beams nearly symmetrically with respect to a plane passing through the central optical axis of the reflected beam and perpendicular to the optical waveguide 2 and for focusing the beams generated by quartering, photodetectors 25 and 25' comprising photodiodes for respectively detecting beams reflected by the information recording face (disk) and quartered by the beam splitter and converting the detected beams in electric signals, and a surface acoustic wave generating electrode 12 so formed between the focus grating coupler and the beam splitter as to deflect the laser beam by surface acoustic waves. The grating period of the beam splitters 24a and 24b become dense in accordance with the travelling direction of light. Further, the substrate 1, the photodetectors 25 and 25', and the semiconductor laser LD are placed on a metal stage 36 comprising aluminum, for example.

Operation of the optical head configured as described above will now be described. First of all, the laser beam emitted from the semiconductor laser LD is led to the optical waveguide 2 by collimater means comprising the incidence grating coupler 43 and the diffraction grating 6 for aberration correction and then converted into parallel beams.

The design technique of the incidence grating coupler 43 and the aberration correcting grating 6 will now be described. Regarding the above described two diffraction gratings as holograms of transmission type, phase transfer functions for converting the beam emitted by the LD into parallel beams are calculated for respective diffraction gratings. Subsequently, dependence of the above described phase transfer functions upon wavelength is examined. The phase transfer function of each diffraction grating is so defined again that a change in diffraction angle caused by wavelength variation may be canceled in each diffraction grating.

Subsequently, the above described collimated laser beams are propagated through the optical waveguide 2 and are incident on the substrate 1 located outside the optical waveguide 2 at a radiation angle $\theta$ (30° in this case) by the grating coupler 3' having equal pitches and taking rectilinear shapes. The beams are then totally reflected by the substrate end face 23 and are incident on the optical waveguide 2 again. The beams passed through the optical waveguide 2 are focused on one point on a disk not illustrated by the Fresnel lens 22.

When the laser beam emitted by the semiconductor laser LD is propagated in the direction of the Fresnel lens 22, the beam is not diffracted by the beam splitters 24a and 24b when the beam passes through those beam splitters because the Bragg diffraction condition is not satisfied. Depending upon whether a signal pit is present or not, the laser beam focused onto the optical disk is scattered or reflected. The laser beam refracted by the disk is led into the optical waveguide 2 again by the above described linear uniform grating coupler 3' (in accordance with the optical path indicated by arrows hereafter inverted). The laser beam thus led is so quartered by the beam splitters as to generate two pairs, i.e., four beams nearly symmetrical with respect to a plane which passes through the central optical axis of the above described laser beam in the traveling direction and which is perpendicular to the optical waveguide 2. The four laser beams are radiated into the substrate 1 at respective predetermined angles to become focused laser beams 27a and 27b. The beams 27a and 27b radiated from an end face 28 of the substrate 1 are respectively sent to quartered photodetectors 25 and 25', and converted into electric signals by the photodetectors of the reflected beams which are radiated from the beam splitters 24a and 24b to the substrate 1 can be uniquely set by setting the pitches of the diffraction gratings included in the beam splitters at predetermined values. Further, the convergence point, i.e., focal point of the converging laser beam 27 can be uniquely set by setting the curvature of the diffraction grating.

The optical deflector 12 using surface acoustic waves is not essential. By changing the frequency of the applied acoustic waves, however, the guided wave passing through the optical waveguide can be easily deflected. The optical deflector 12 is thus effective for fine adjustment of optical path positioning.

Figure 12:
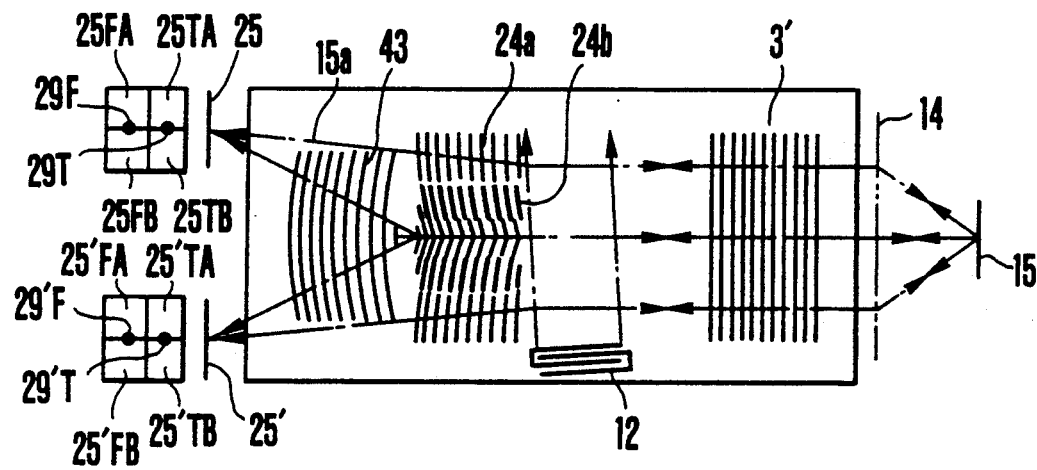
FIGS. 12 to 14 show the detection principle of focus spot error signal of an optical disk.
Figure 13:
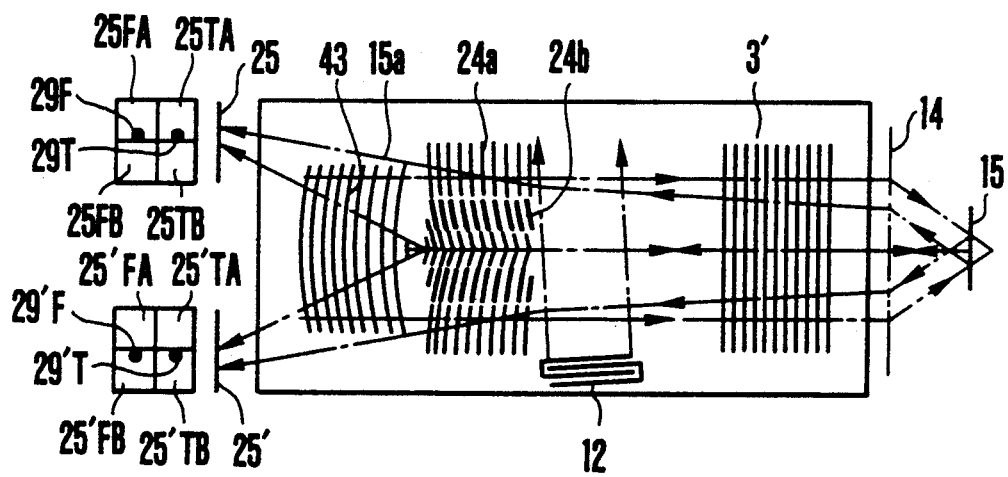
Figure 14:
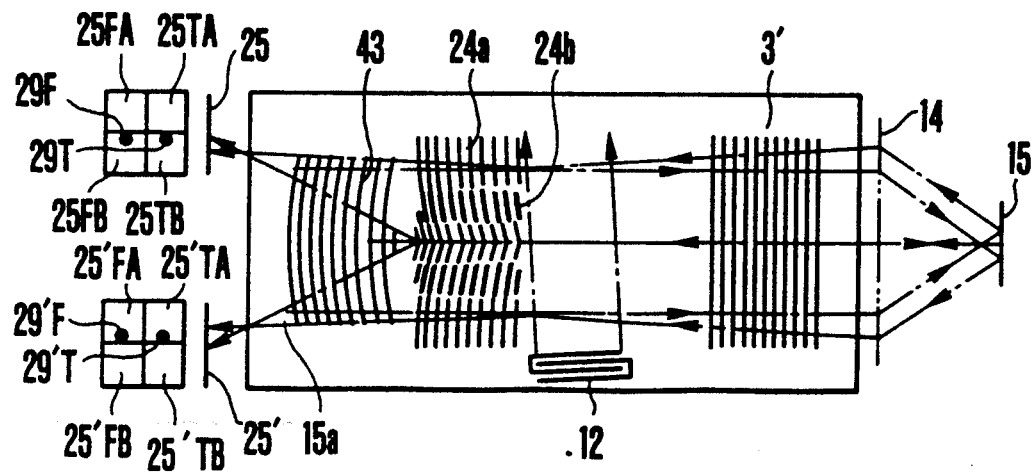

FIGS. 12, 13 and 14 show relations between focusing spots 29F, 29T, 29'F and 29'T on the above described photodetectors 25 and 25' and the positions focus points of the laser beams radiated from the grating coupler 3', obtained when the photodetectors 25 and 25' comprise quartered photodiodes 25FA, 25FB, 25TA and 25TB, and 25'FA, 25'FB, 25'TA and 25'TB, respectively. That is to say, whether the focus point of the laser beam is located on the face of the optical disk 15 or not, i.e., the principle of the so-called focusing error signal detection is shown. FIG. 12 shows the case where the optical disk is located at the focal point. FIG. 13 shows the case where the optical disk is located in front of the focal point. FIG. 14 shows the case where the optical disk is located behind the focal point. Assuming that outputs of the photodiodes 25FA, 25FB, 25'FA, 25'FB, 25TA, 25TB, 25'TA and 25'TB are respectively $P_{FA}$, $P_{FB}$, $P_{FA'}$, $P_{FB'}$, $P_{TA}$, $P_{TB}$, $P_{TA'}$ and $P_{TB'}$, information recorded on the face of the optical disk 15 can be read out by using their sum $P_A+P_B+P_{A'}+P_{B'}+P_{TA}+P_{TB}+P_{TA'}+P_{TB'}$. A focus error signal indicating whether the focal point of the laser beam radiated from the focusing grating coupler is located on the face of the disk 15 is obtained by using $(P_{FA}+P_{FB'})-(P_{FB}+P_{FA'})$. Further, a tracking error signal is obtained by using $(P_{TA}+P_{TB})-(P_{TA'}+P_{TB'})$. In this way, the focus point error detection signal and the tracking error detection signal are obtained by using the fact that imaging points of focusing spots 29F, 29T, 29'F and 29'T on the quartered photodiodes A and B move on the photodetecting face.

A method for fabricating the beam splitter 24 used in the optical head of the present invention will now be described concretely. The beam splitter 24 comprises a diffraction grating having equal periods and taking curvilinear shapes formed on the above described optical waveguide 2. The shape equation of this diffraction grating is obtained as holograms of plane waves and spherical waves converging onto the above described photodetectors 25 and 25'. That is to say, one pair of beam splitters 24a are symmetric with respect to y axis when coordinate axes x and y are taken as shown in FIG. 10. Therefore, the shape equation of the beam splitter at $x \leq 0$ is represented as $$Ny + n\sqrt{(x + f\cos\theta\sin\Psi)^2 + (y - f\cos\theta\cos\Psi)^2 + (f\sin\Psi)^2} = m\lambda_o + nf \tag{26}$$

where N is the effective refractive index of the optical waveguide 2; n the refractive index of the substrate 1, and m integers indicating respective curves. The equation (26) has been so derived that the relation m=0 may be satisfied for a curve passing through the point $x=y=0$. Further, f is the focal length, $\lambda_o$ wavelength of the laser beam in vacuum, $\theta$ an angle formed by a straight line coupling the convergence point of the laser beam and the origin with respect to the x-y plane, and $\Psi$ an angle formed by the y axis and a straight line obtained by projecting the straight line coupling the convergence point of the laser beam and the origin onto the x-y plane. The diffraction grating comprising curves represented by the equation (26) was fabricated by performing pattering with an electron beam lithography apparatus as described before and by using the known etching technique. In this embodiment, a pair of beam splitters 24a having an average pitch of 3 μm and the length of beam splitter L=1.6 mm were fabricated by using diffraction gratings comprising TiO₂. The beam splitters having different imaging points were fabricated in the same way. When patterning is to be performed on the resist by using an electron beam lithography apparatus in forming diffraction gratings included in the beam splitters 24a and 24b, sectional shapes of respective curves can be so formed as to be sawtooth by changing stepwise the amount of irradiation of an electron beam in drawing a curve and repeating this change nearly periodically to draw all curves. By performing etching using the resist thus patterned, a diffraction grating which comprises curves respectively having sawtoothed sectional shapes represented by the equation (26).

As evident from FIGS. 12, 13 and 14 showing the principle for detecting the focusing error signal, beams which are reflected by the disk and then incident on the optical waveguide 2 via the Fresnel lens 22 or the objective lens 14 are not parallel beams when the disk is not located on the focal point of the Fresnel lens 22 or the objective lens 14. However, the beam splitter of the optical head according to the present invention is not a prior art device of coplanar type which splits and focuses a laser beam in a face of the optical waveguide 2, but has such configuration as to converge quartered laser beams outside the optical waveguide 2. Therefore, the reception angle is large. In case laser beams which are not parallel beams are incident as well, the Bragg diffraction condition is satisfied, resulting in effective operation. Other fabrication process steps are similar to those of the embodiment 1.

A fifth embodiment relates to an optical integrated circuit used in an integrated optical head described with reference to the embodiment 1, in which a proton exchange optical waveguide having a high optical damage threshold and a high deflection efficiency is used to fabricate the optical waveguide 2.

A method for fabricating the above described proton exchange optical waveguide will hereafter be described in detail.

One face of a LiNbO₃ crystal wafer with x-cut is optically polished to the extent of approximately 1/10 of the wavelength λ of the laser beam in use. It is desired that the purity concentration of transition metal of the above described crystal substrate is as small as possible. The optical damage threshold values are indicated with respect to a substrate having a concentration of transition metal such as iron (Fe) close to 1 pm. In a highly pure LiNbO₃ substrate now commercially available, the concentration of Fe is approximately 0.05 ppm. It has been confirmed that the optical damage threshold is raised by approximately one figure by using the above described highly pure LiNbO₃ substrate.

After the substrate was optically polished, it underwent ultrasonic cleaning in trichloroethylene, isopropyl alcohol, ethanol and pure water. The substrate was then dried in nitrogen blow.

The above described substrate then underwent proton exchange processing. Ion exchange was performed in a vessel made of quartz. As weak acid of the proton exchange source, carboxylic acid such as benzoic acid and phosphoric acid such as pyrophosphoric acid may be used. In the present invention, a mixture of benzoic acid and lithium benzoate was used. The substitution ratio x of Li⁺ and H⁺ in the above described optical waveguide is deeply related to the mixture ratio M of benzoic acid and lithium benzoate. The mixture ratio M is defined as $$M = (\text{The number of mols of lithium benzoate}) \div \{(\text{The number of mols of benzoic acid}) + (\text{The number of mols of lithium benzoate})\} \times 100\%$$

As a result of study, it was confirmed that x depended upon neither the proton exchange temperature nor the proton exchange time, but x depended only upon M. It was found that an optimum range of x was attained as $0.4 < x < 0.55$ by making M equivalent to 2.5 when a LiNbO₃ substrate with x cut was used. In the present embodiment, therefore, lithium benzoate having a weight of 4.802 g and benzoic acid having a weight of 178.605 g were put into a quartz vessel and mixed together sufficiently. They underwent thermal processing at 245° C. for 5 hours. After thermal processing, the substrate taken out from the quartz vessel underwent ultrasonic cleaning using ethanol and pure water. In order to examine optical characteristics of the resultant optical waveguide, a He-Ne laser beam having a wavelength λ = 633 nm was propagated in the y direction within the optical waveguide by using a rutile prism. As a result, the optical waveguide had a single mode, and the effective refractive index of the guided beam was 2.2642. As a result of examining the optical propagation loss by means of a conventional bi-prism method, a favorable value of 1 kB/cm was obtained. In case of a He-Ne laser beam, the optical damage threshold value was as fine as 750 W/cm³.

Subsequently, a comb electrode for exciting surface acoustic waves was fabricated on a substrate which had undergone the above described proton exchange processing. The surface acoustic wave propagation speed of LiNbO₃ with x cut according to the present embodiment in the Z direction was 3,500 m/sec. The electrode pitch was defined as 2.9 μm so that the center frequency $f_o$ might become 300 MHz. The deflection angle is approximately 30 mrad when $f_o = 300$ MHz. The above described electrode length is L = 2.8 mm and the number of pairs N is 8.

In order to examine characteristics of the resultant optical deflector, the radiation conductance was measured by using a network analyzer, and the effective electromechanical coupling coefficient K was measured. The measurement results were measured with those of an optical deflector fabricated on a bulk substrate which had not undergone proton exchange processing. In case of a surface acoustic wave exciting electrode fabricated on a proton exchange optical waveguide according to the present embodiment, an effective value of K obtained as a result of measurement was approximately 70% of that of an electrode fabricated on bulk substrate and did not exhibit significant deterioration. For reference, an excitation electrode for a surface acoustic wave propagated in a direction other than the Z direction was fabricated on a proton exchange optical waveguide fabricated under the condition of the present embodiment, and the effective value of K was measured. As a result, it was found that the value of K was small in case of propagation in the y direction.

Figure 15:
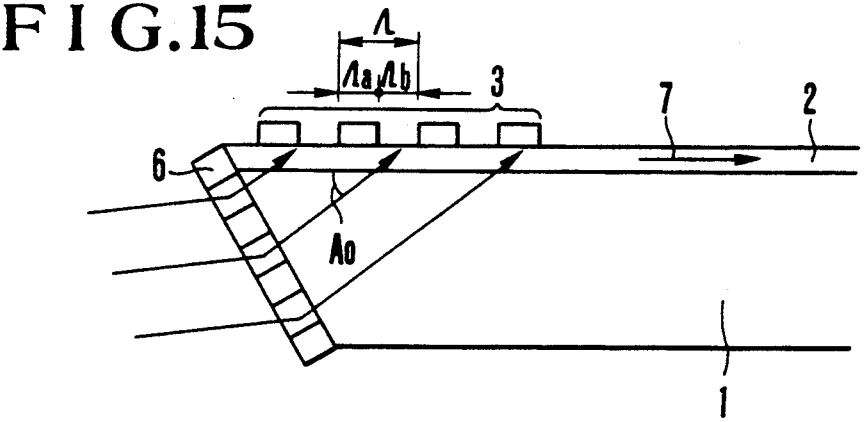
FIGS. 15 to 18 show a sixth embodiment of the present invention.
Figure 16:
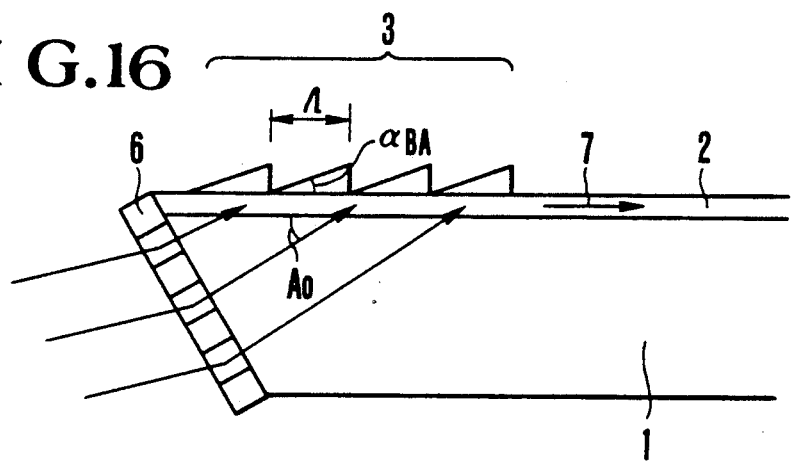

FIGS. 15 to 18 show a sixth embodiment of the present invention. As described before, a grating of waveguide formed on an optical waveguide is here used as the grating coupler for making a semiconductor laser beam incident on the optical waveguide. A dielectric such as TiO₂, SiO₂ or Si-N can be used as a constituent material of the grating coupler. Alternatively, the optical waveguide itself may be so processed as to have grooves. The sectional shape of the grating coupler may be rectangular as shown in FIG. 15. In this case, however, there is a problem that the incidence coupling efficiency of the semiconductor laser beam with respect to the optical waveguide lowers when the ratio of the grating width Λa for the grating pitch Λ shown in FIG. 15 to the width Λb of a region wherein the grating is not present, i.e., Λa/Λb is deviated from unity. As a method for solving this problem, there is a method of making the grating coupler take a blazed sectional shape. The word "blazing" means that the sectional shape of the grating is made nearly triangular. The most preferred triangle is a right-angled triangle Assuming now that the angle formed by the right-angled triangle with respect to the face of the optical waveguide is a blazed angle $\alpha_{BA}$, it is desirable that $\alpha_{BA}$ is an angle satisfying the relation $$N \cos\alpha_{BA} = n_s (\sin A_o \sin\alpha_{BA} + \cos A_o \cos\alpha_{BA}) \quad (27)$$

where
$\alpha_{BA}$ = blazed angle of the grating coupler
$A_o$ = incidence angle of laser beam to the grating coupler
$N$ = effective refractive index of the optical waveguide $n_s$ = refractive index of the optical integrated circuit substrate.

At this time, the relationship between $\Lambda$ and $A_o$ is represented by equation (28).

$$\cos A_o = \frac{N - \lambda(0)/\Lambda}{n_s} \quad (28)$$

By defining $\Lambda$ and the wavelength $\lambda(0)$ of the semiconductor laser beam, $A_o$ is defined, and $\alpha_{BA}$ is then defined from the equation (27). To be concrete, $\alpha_{BA}$ becomes approximately 14° when $\Lambda = 3$ μm, $\lambda(0) = 0.78$ μm, $N = 2.209$ and $n_s = 2.2$. A blazed grating coupler can be typically formed by using the ion milling technique and making ions incident on a substrate for forming an optical integrated circuit slantly. Fabrication error of a blazed grating depends upon the incidence angle of ions obtained when the ion milling technique is used.

Even if $\alpha_{BA}$ does not satisfy the equation (27) completely, however, the effect is exhibited. In case where the incidence coupling efficiency of a grating coupler having rectangular sectional shapes is made equal to unity, for example, blazing raises the incidence efficiency to twice or more. Even if the error of $\alpha_{BA}$ is ±10%, the incidence efficiency is lowered by only approximately 10%.

Figure 17:
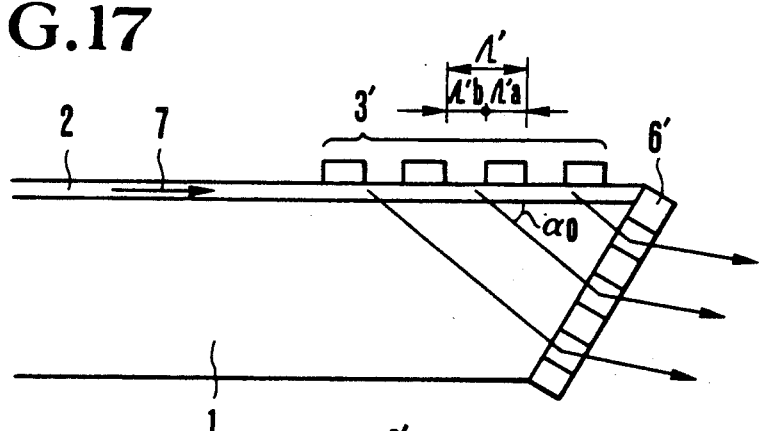
Figure 18:
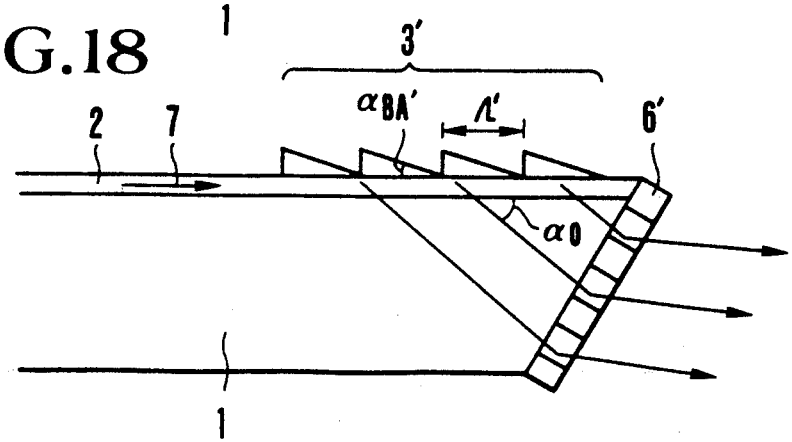

The above described effect of blazing the incidence grating coupler for the optical waveguide is similarly appreciated in case of a grating coupler for diffracting or radiating a beam from the optical waveguide into the substrate as well. In FIG. 17, a grating coupler taking rectangular sectional shapes is shown. By using a grating coupler taking blazed sectional shapes as shown in FIG. 18, however, the efficiency of diffraction or radiation to the substrate is significantly improved. An optimum blazed angle $\alpha'_{BA}$ at this time is given by $$N \cos\alpha'_{BA} = n_s(\sin\alpha_o \sin\alpha'_{BA} + \cos\alpha_o \cos\alpha'_{BA}) \quad (29)$$

where $\alpha_o$ = radiation angle or diffraction angle of a laser beam from the grating coupler.

The relationship between the grating period $\Lambda'$ of the grating coupler and $\alpha_o$ is represented by equation (30). By defining $\Lambda'$ and the wavelength $\lambda(0)$ of the semiconductor laser beam, $\alpha'_{BA}$ is defined.

$$\cos\alpha_o = \frac{N - \lambda(0)/\Lambda'}{n_s} \quad (30)$$

In general, the above described $\Lambda$ and $\Lambda'$ are equivalent each other. Therefore, $\alpha_{BA}$ and $\alpha'_{BA}$ become equivalent each other. In case of a grating coupler taking rectangular sectional shapes, relations among the propagation vector of the guided beam, the propagation vector of the diffracted beam, and the grating vector of the grating coupler cannot completely satisfy the Bragg condition. Since a diffracted beam of high order (± second or higher) is thus generated, a grating coupler having a high efficiency is not obtained. On the other hand, only diffraction in the vicinity of the Bragg condition is typically caused by blazing the sectional shape of the grating coupler. In this case, generation of diffracted beams of high orders is prevented, and the efficiency of the grating coupler is raised to approximately twice. A proper typical value of $\alpha'_{BA}$ is approximately 14°. In the same way as the case of $\alpha_{BA}$ described before, however, the effect is not significantly lowered even if processing precision varies by approximately ±2°. As heretofore described, it is possible to raise the incidence and radiation coupling efficiencies significantly by blazing the grating coupler. Blazing a grating coupler does not affect a grating for aberration correction disclosed in the preceding embodiments.

Figure 19A:
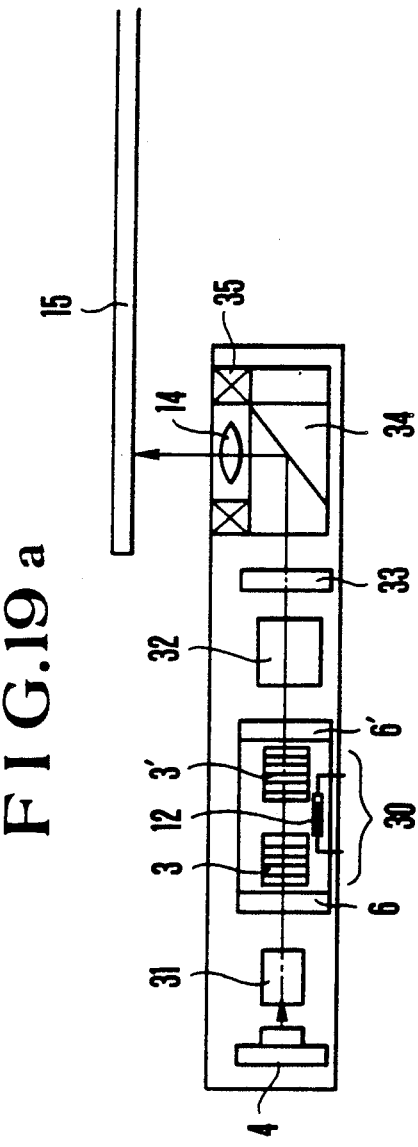
FIGS. 19a and 19b show a seventh embodiment of the present invention, which is an optical system of an optical head comprising a combination of an optical integrated circuit and an optical device of bulk type.
Figure 19B:
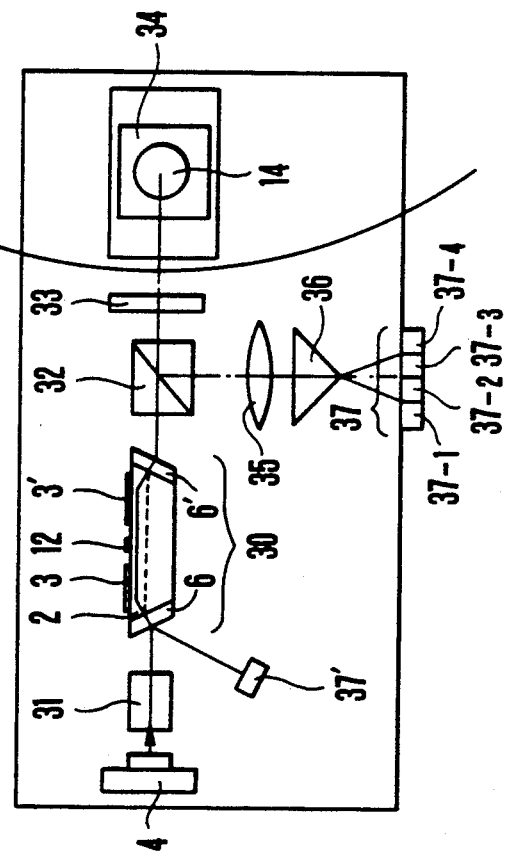

FIG. 19 shows a seventh embodiment of the present invention. An optical system of an optical head comprising a combination of an optical integrated circuit and an optical device of bulk type which is a conventional optical device is shown in FIG. 19. FIG. 19a is a side view of the optical system. FIG. 19b is a front view of the optical system. In the optical system shown in FIG. 19, numeral 4 denotes a light source, 31 a focusing lens for collimating a beam emitted from a semiconductor laser, 37' a photodetector for monitoring, 30 an optical integrated circuit according to the present invention comprising grating couplers 3 and 3' formed on the optical waveguide 2, an SAW optical deflector 12 and aberration correcting gratings 6 and 6'. Numeral 32 denotes a deflecting beam splitter, 33 a λ/4 plate, 14 an iris lens for irising a beam to generate a minute spot beam. Numeral 35 denotes a voice coil for vertically moving an objective lens so that the distance between the optical disk and the objective lens may be always kept constant with respect to a face swing of the optical disk or the like. Numeral 15 denotes an optical disk. A beam reflected by the optical disk is passed through the λ/4 plate again and changed in deflection direction. After the beam is reflected by the polarizing beam splitter and focused by a convex lens, it is led into a triangular prism 36 referred to as wedge. The beam is bisected and changed in direction by the triangular prism 36 and led into a quartered optical detector 37. A servo signal for tracking servo of the optical disk can be obtained from the difference between the sum of 37-1 and 37-2 and the sum of 37-3 and 37-4. A servo signal for focusing servo can be obtained from the difference between the sum of 37-1 and 37-4 and the sum of 37-2 and 37-3. A reproduced signal for taking out disk information can be obtained from the sum of 37-1, 37-2, 37-3 and 37-4. This optical head has a feature that the microtracking speed is rapid (i.e., the microseek time is short) because optical deflection in the tracking direction can be performed in the SAW optical deflector 12. Further, this optical head has a feature that the light use coefficient is high because the returned beam is not returned to the optical waveguide.

Figure 20:
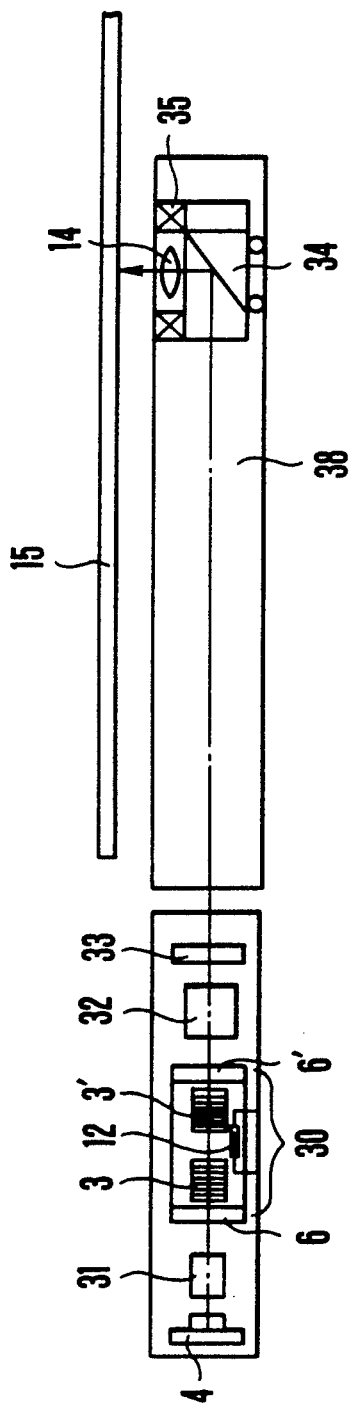
FIG. 20 shows an eighth embodiment of the present invention, which is an optical system of an optical head having a separated objective lens portion of for detecting information recorded on an optical disk.
Figure 20:
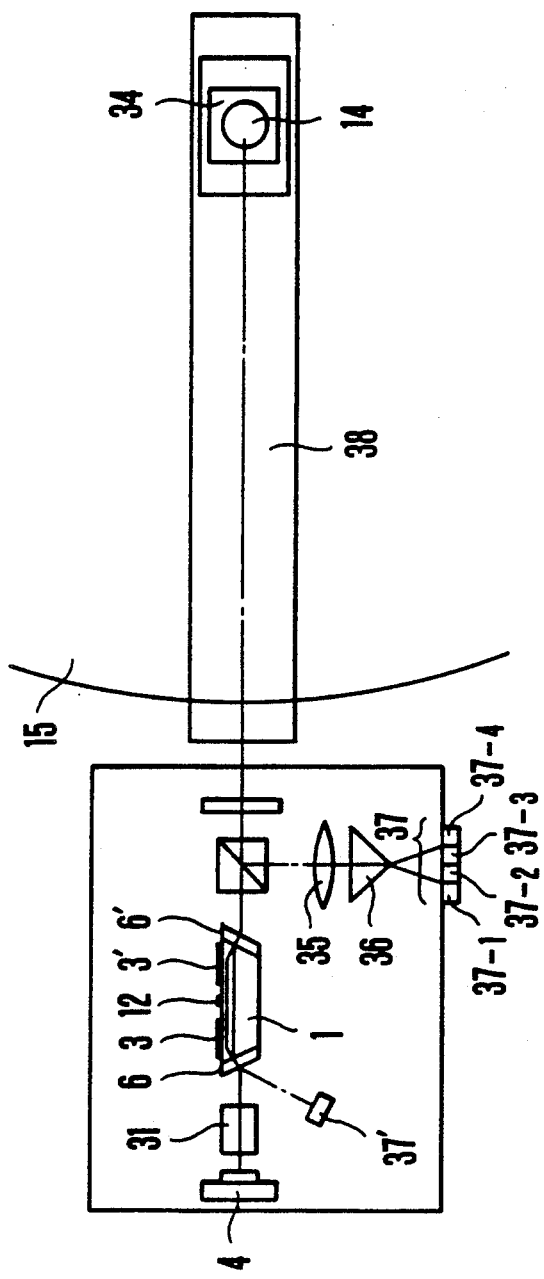

FIG. 20 shows an eighth embodiment of the present invention. In the same way as FIG. 19, an optical system of an optical head comprising a combination of an optical integrated circuit according to the present invention and an optical device of bulk type of the prior art is shown in FIG. 20. FIG. 20a is a side view of the optical system. FIG. 20b is a front view of the optical system. The optical head of FIG. 20 differs from the optical head of FIG. 19 in that the glass block (prism) 34 for changing the optical path, the iris lens 14 and the voice coil 35 are separated from the remaining optical system. In the optical head shown in FIG. 19, the whole of the head optical system including the semiconductor laser must be moved when macroseek is to be performed. However, the head shown in FIG. 20 has a feature that microseek can be performed by incorporating only the glass block, the iris lens and the voice coil into a core actuator 38 and moving the course actuator 38. As a result, the moving part of the head becomes small-sized and light-weighted, and the speed of macroseek can be improved. In the present head, therefore, the macroseek time and the microseek time can be simultaneously shortened as a result of reduction in size and weight of the SAW optical deflector and the moving part of the head. Accordingly, the present head has configuration effective as a high-speed access optical head.

Figure 21A:
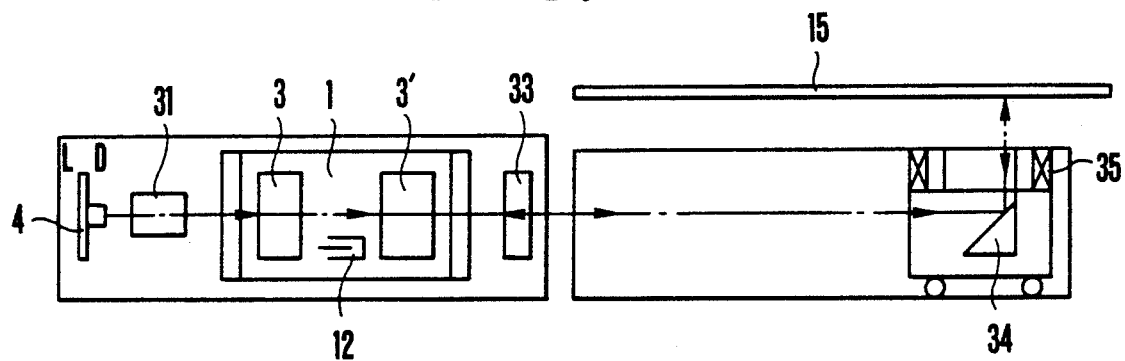
FIG. 21a is its side view.
Figure 21B:
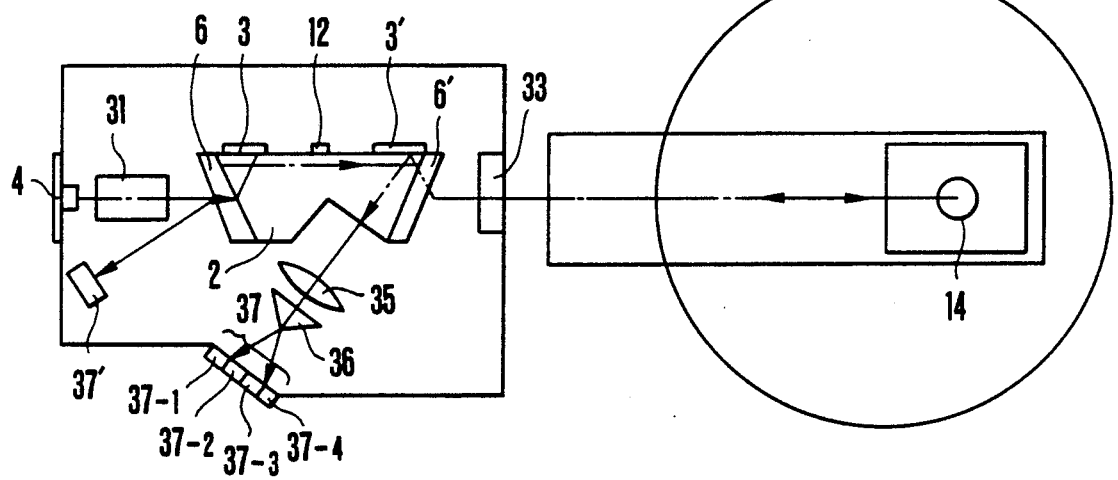
FIG. 21b is its top view.

FIG. 21 shows a ninth embodiment of the present invention, which is an improvement of the optical head shown in FIG. 20. FIG. 21a is a side view of its optical system. FIG. 21b is a front view of its optical system. The optical head of FIG. 21 differs from the optical head of FIG. 20 in that a notch is formed in the bottom face of the optical integrated circuit substrate 1 and the beam returned from the optical disk is not incident on the grating coupler, but is reflected by the grating coupler, emitted to the outside of the substrate 1 through the notch, and received by the optical detector. In the grating coupler, the polarizing direction of the radiated beam differs from that of the incidence beam because the ¼ λ plate 33 is present. In case where the deflection direction is different, the effective refractive index N of the optical waveguide is different. Therefore, the returned beam is not coupled in the grating coupler, but is totally reflected into the substrate. This scheme utilizes the difference of coupling efficiency of the grating coupler caused by difference in polarizing direction. As compared with the scheme of FIG. 20, the scheme of FIG. 21 has a feature that the deflection beam splitter becomes unnecessary.

Figure 22:
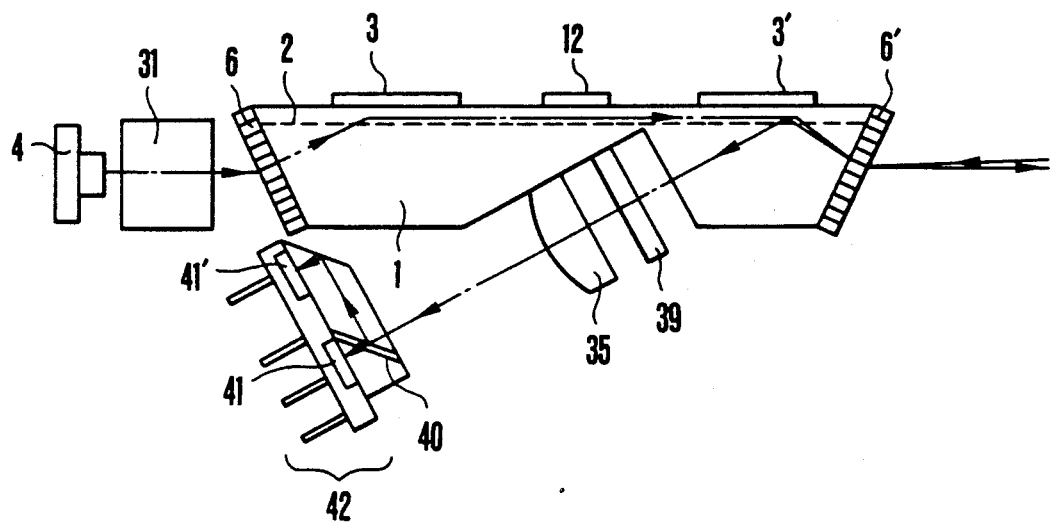
FIG. 22 shows a tenth embodiment of the present invention and is a side view showing an optical system of an optical head used in an optical magnetic apparatus.

FIG. 22 shows a tenth embodiment of the present invention, and shows an optical head corresponding to an optical magnetic disk. The present optical head has a feature that the optical path of the returned beam is different from that of the forward beam. As a result, the returned beam is not incident on the grating coupler, and the beam is radiated from a notch of the substrate. The difference between the optical path of the forward beam and that of the backward beam is caused by changing the inclination angle of the aberration correcting grating 6' or adjusting the angle of the bending prism, for example. The beam reflected by the grating coupler 3' is incident on a ¼ λ plane 39. After the polarizing direction is deflected, the beam is converted into a converging beam by a lens 35. In an optical detector 42 having a polarization separating film 40, the optical strength is detected for each of the TE polarized beam and the TM polarized beam. The focus servo signal, the tracking servo signal and the optical disk pit signal can be taken out from the sum and/or difference signal of quartered optical detectors 41 and 41'.

As heretofore described in detail, it is possible to prevent lowering of incidence and radiation coupling efficiencies of the grating coupler and aberration such as chromatic aberration, which are caused by wavelength variation of the beam. Even if a multi-mode semiconductor laser is used as the light source, therefore, an optical integrated circuit having characteristics which do not largely change can be formed.

Further, it is possible to obtain an optical head apparatus having a high light use efficiency, a high optical damage threshold, and a high deflection efficiency, allowing high speed access, and having a wide range in which the focusing servo and tracking servo mechanism effectively works. In addition, optical integrated circuits according to the present invention can be widely applied to various optoelectronics parts such as an optical head for optical disk apparatus and an optical head for laser beam printer.

What is claimed is:

1. An optical apparatus comprising:
   an optical waveguide disposed with respect to a surface of a substrate for propagating a laser beam therealong;
   grating coupler means formed on the optical waveguide for enabling at least one of coupling of the laser beam to the optical waveguide as an input laser beam and coupling of the laser beam from the optical waveguide as an output laser beam; and
   aberration correction grating means disposed with respect to the grating coupler means for enabling at least one of aberration correction of the input laser beam to the grating coupler means and aberration correction of the output laser beam from the grating coupler means.

2. An optical apparatus according to claim 1, wherein the aberration correction grating means has grating lines of a constant pitch and the grating coupler means has grating lines of a constant pitch, the grating lines of the aberration correction grating means and the grating coupler means extending in the same direction and being perpendicular to an optical axis of at least one of the input laser beam and the output laser beam.

3. An optical apparatus according to claim 2, wherein the optical waveguide is formed one of in and on the surface of the substrate.

4. An optical apparatus according to claim 2, wherein the optical apparatus is an optical integrated circuit.

5. An optical apparatus according to claim 2, wherein the aberration correction grating means includes at least one of a first aberration correction grating disposed with respect to the grating coupler means for enabling aberration correction of the input laser beam and a second aberration correction grating disposed with respect to the grating coupler means for enabling aberration correction of the output laser beam.

6. An optical apparatus according to claim 5, wherein at least one of the first aberration correction grating is a planar member disposed with respect to a laser source at a predetermined angle larger than 0° and smaller than 90° and the second aberration correction grating is a planar member disposed with respect to an output lens at a predetermined angle larger than 0° and smaller than 90°.

7. An optical apparatus according to claim 5, wherein the grating coupler means includes a first grating coupler for coupling of the input laser beam to the optical waveguide and a second grating coupler for coupling an output laser beam from the optical waveguide.

8. An optical apparatus according to claim 7, wherein the first grating coupler and the second grating coupler have grating lines of a constant pitch and the first aberration correction grating and the second aberration correction grating have grating lines of a constant pitch.

9. An optical apparatus according to claim 8, wherein the constant grating pitch of the first and second grating couplers is determined by satisfying the relationship $$2\pi/\lambda < 2\pi N/\lambda + 2\pi m/\Lambda, \text{ and } m = -1$$

where $\Lambda$ is the grating period of the grating coupler means, m is the order of diffraction of the aberration correction of the aberration correction grating means which is set at $-1$, N is the effect of refractive index of the optical waveguide, and λ is the wavelength of the laser beam.

10. An optical apparatus according to claim 2, further comprising a laser source, the laser source being a semiconductor laser for radiating laser beam.

11. An optical apparatus according to claim 2, wherein the aberration correction grating means has a grating period satisfying a Bragg condition with respect to a laser beam having one wavelength in a range of λ(0) to λ(1), the laser beam having a wavelength distribution of λ(0) to λ(1).

12. An optical apparatus according to claim 2, wherein the aberration correction grating means has a grating period satisfying a Bragg condition with respect to a laser beam having a wavelength $[\lambda(0)+\lambda(1)]/2$ when the wavelength of the laser beam irradiated from a laser source has a distribution of λ(0) to λ(1).

13. An optical apparatus according to claim 2, wherein the grating coupler means for making the laser beam incident on the optical waveguide is a blazed grating coupler means having blazed sectional shapes.

14. An optical apparatus according to claim 13, wherein the blazed grating coupler means has a blazed angle substantially satisfying a relation:

$$N \cos_{\alpha BA} = n_S (\sin A_o \sin_{\alpha BA} + \cos A_o \cos_{\alpha BA})$$

where:
αBA = blazed angle of the blazed grating coupler means for laser beam incidence;
$A_o$ = incidence angle of the laser beam to the blazed grating coupler means;
N = effective index of the optical waveguide; and
$n_S$ = refractive index of the substrate.

15. An optical apparatus according to claim 1, wherein the optical waveguide is formed on the surface of the substrate so as to have a refractive index higher than a refractive index of the substrate, the optical waveguide, the substrate, the grating coupler means and the aberration correction grating means forming an optical integrated circuit, the output laser beam being radiated from the optical waveguide outside of the optical waveguide, and further comprising focusing means for focusing the output laser beam from the optical integrated circuit onto a point, the grating coupler means being formed at a boundary face of the optical waveguide so as to radiate the output laser beam toward and inside portion of the substrate, the grating coupler means being a linear periodic type grating coupler means, and the aberration correction grating means having grating lines of a constant grating pitch for diffracting the output laser beam from the optical waveguide to the focusing means, the grating coupler means having grating lines aligned with the grating lines of the aberration correction grating means and arranged perpendicularly to an optical axis of the output laser beam.

16. An optical apparatus according to claim 1, wherein the optical apparatus is an optical integrated head for an optical disk apparatus, further comprising a semiconductor laser for radiating the laser beam, the aberration correction grating means including a first aberration correction grating having grating lines of a constant grating pitch for diffracting the laser beam from the semiconductor laser, the grating coupler means including a first grating coupler formed on the optical waveguide and having grating lines of a constant grating pitch for coupling the laser beam from the first aberration correction grating to the optical waveguide, an optical deflector disposed on the optical waveguide so as to deflect the laser beam propagated therein, the optical deflector utilizing a surface acoustic wave, the grating coupler means further including a second grating coupler formed on the optical waveguide and having grating lines of a constant grating pitch for coupling the laser beam deflected by the deflector into the substrate, the aberration correction grating means further including a second aberration correction grating having grating lines of a constant grating pitch for diffracting the laser beam from the second grating coupler and for correcting a wavelength variation of the diffracted laser beam, and further comprising a lens for focusing the laser beam from the second aberration correction grating onto an optical disk having an optical recording medium, and a photodiode for detecting a beam returned from the optical disk.

17. An optical apparatus according to claim 1, wherein the optical apparatus includes an optical integrated circuit for a laser beam printer, the optical waveguide being disposed on a surface of the substrate, the substrate being one of a dielectric substrate and a glass substrate, the optical waveguide having a refractive index higher than a refractive index of the substrate, and further comprising a semiconductor laser for radiating the laser beam to the optical waveguide.

18. An optical apparatus according to claim 17, wherein the optical integrated circuit comprises a first glass block for making the laser beam radiated from the semiconductor laser to be parallel incident on the substrate at a predetermined angle, the aberration correction grating means including a first aberration correction grating integrally formed between the first glass block and the substrate and having grating lines of a constant grating pitch for diffracting the laser beam from the glass block into the substrate, the grating coupler means including a first grating coupler formed on the optical waveguide and having grating lines of a constant grating pitch for coupling the laser beam from the first aberration correction grating into the optical waveguide, an optical deflector located within the optical waveguide and utilized a surface acoustic wave for deflecting the laser beam propagated along the optical waveguide, the grating coupler means further including a second grating coupler formed on the optical waveguide and having grating lines of a constant grating pitch for coupling the laser beam deflected by the optical deflector into the substrate, the aberration correction grating means further including a second aberration correction grating integrally coupled to the substrate for correcting aberration caused by a wavelength variation of the laser beam from the second grating coupler, and a second glass block for enabling radiation of the aberration corrected laser beam outwardly from the substrate.

19. An optical apparatus according to claim 1, wherein the optical apparatus is an optical integrated circuit, the substrate being a lithium niobate (LiNbO$_3$) crystal, and the optical waveguide being a proton exchange optical waveguide formed on the surface of the substrate so as to have a refractive index higher than a refractive index of the substrate by exchanging a part of lithium ions within the substrate with protons, the optical waveguide having a composition $H_xLi_{1-x}NbO_3$, the substitution ratio x of lithium ions and protons satisfying the relation $0.4 < x < 0.55$.

20. An optical apparatus according to claim 1, wherein the grating coupler means includes a first grating coupler for coupling of the laser beam to the optical waveguide and a second grating coupler for coupling of the laser beam from the optical waveguide, further comprising an optical deflector formed on the optical waveguide so as to utilize a surface acoustic wave for deflecting the laser beam propagated along the optical waveguide to the second grating coupler, and focusing lens means including a focusing drive means for focusing the output laser beam onto an optical disc, and photodetecting means for detecting a reflected beam from the optical disk.

21. An optical apparatus according to claim 20, wherein the focusing lens means includes a lens for focusing the output laser beam onto the optical disk and the focusing drive means includes bending mirror means disposed on a movable carrier for enabling a macroseek operation in a radial direction of the optical disk, the optical deflector utilizing the surface acoustic wave enabling a microseek operation.

22. An optical apparatus according to claim 21, further comprising a semiconductor laser for radiating the laser beam, the aberration correction grating means including a first aberration correction grating having grating lines of a constant grating pitch for diffracting the laser beam from the semiconductor laser, the first grating coupler being formed on the optical waveguide and having grating lines of a constant grating pitch for coupling the laser beam from the first aberration correction grating to the optical waveguide, the second grating coupler being formed on the optical waveguide and having grating lines of a constant grating pitch for coupling the laser beam deflected by the optical deflector into the substrate, the aberration correction grating means further including a second aberration correction grating having grating lines of a constant grating pitch for diffracting the laser beam from the second grating coupler to the focusing lens means.

23. An optical apparatus according to claim 1, further comprising a semiconductor laser for radiating the laser beam, a collimator lens for converting the laser beam radiated from the semiconductor laser into parallel rays, the optical waveguide being formed on the substrate and providing an acousto-optic effect, the substrate being a dielectric substrate, the grating coupler means including a first grating coupler for coupling of the laser beam to the optical waveguide, an optical deflector being disposed on the optical waveguide and utilizing a surface acoustic wave for deflecting the laser beam propagated along the optical waveguide, the grating coupler means further including a second grating coupler for coupling a deflected laser beam from the optical waveguide, focusing means including a lens for focusing the laser beam from the second grating coupler onto an optical disk, and photodetector means for detecting a reflected beam from the optical disk through the substrate, the substrate including a notch section forged at a bottom portion thereof from which the reflected beam is radiated through the aberration correction grating means and the second grating coupler.

24. An optical apparatus according to claim 23, wherein the aberration correction grating means includes a first aberration correction grating having grating lines of a constant grating pitch for diffracting the laser beam from the semiconductor laser, the first grating coupler being formed on the optical waveguide and having grating lines of a constant grating pitch for coupling the laser beam from the first aberration correction grating to the optical waveguide, the second grating coupler being formed on the optical waveguide and having grating lines of a constant grating pitch for coupling the laser beam deflected by the optical deflector into the substrate, the aberration correction grating means further including a second aberration correction grating having grating lines of a constant grating pitch for diffracting the laser beam from the second grating coupler.

* * * * *

UNITED STATES PATENT AND TRADEMARK OFFICE
CERTIFICATE OF CORRECTION

PATENT NO. : 5,070,488

DATED : December 3, 1991

INVENTOR(S) : FUKUSHIMA, et al

It is certified that error appears in the above-identified patent and that said Letters Patent is hereby corrected as shown below:

ON THE TITLE PAGE

[73] Assignee: Hitachi, Ltd., Tokyo, Japan

Signed and Sealed this

Twenty-first Day of February, 1995

Attest:

BRUCE LEHMAN

Attesting Officer     Commissioner of Patents and Trademarks